(12) United States Patent
Sato

(10) Patent No.: US 9,359,491 B2
(45) Date of Patent: *Jun. 7, 2016

(54) RUBBER COMPOSITION AND PNEUMATIC TIRE

(75) Inventor: Daisuke Sato, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/361,208

(22) PCT Filed: Jun. 26, 2012

(86) PCT No.: PCT/JP2012/066210
§ 371 (c)(1),
(2), (4) Date: May 28, 2014

(87) PCT Pub. No.: WO2013/099325
PCT Pub. Date: Jul. 4, 2013

(65) Prior Publication Data
US 2014/0329931 A1 Nov. 6, 2014

(30) Foreign Application Priority Data
Dec. 26, 2011 (JP) ................. 2011-284031

(51) Int. Cl.
| | |
|---|---|
| C08L 9/06 | (2006.01) |
| C08K 3/36 | (2006.01) |
| C08L 15/00 | (2006.01) |
| B60C 1/00 | (2006.01) |
| C08C 19/44 | (2006.01) |

(52) U.S. Cl.
CPC ................ C08L 9/06 (2013.01); B60C 1/0016 (2013.04); C08C 19/44 (2013.01); C08K 3/36 (2013.01); C08L 15/00 (2013.01); C08K 2201/006 (2013.01); Y02T 10/862 (2013.01)

(58) Field of Classification Search
CPC .................................. C08K 3/36; C08L 9/06
USPC ........................................ 524/492, 493, 526
See application file for complete search history.

(56) References Cited

U.S. PATENT DOCUMENTS

| | | | |
|---|---|---|---|
| 4,929,679 A | 5/1990 | Akita et al. | |
| 4,945,964 A | 8/1990 | Takiguchi et al. | |
| 5,189,109 A | 2/1993 | Imai et al. | |
| 5,574,109 A | 11/1996 | Lawson et al. | |
| 5,679,744 A | 10/1997 | Kawauzra et al. | |
| 5,834,552 A | 11/1998 | Kawazura et al. | |
| 5,902,856 A | 5/1999 | Suzuki et al. | |
| 5,932,662 A | 8/1999 | Lawson et al. | |
| 5,932,866 A | 8/1999 | Terada et al. | |
| 7,084,228 B2 | 8/2006 | Labauze et al. | |
| 7,351,761 B2 * | 4/2008 | Hochi | 524/442 |
| 2004/0152845 A1 | 8/2004 | Oshima et al. | |
| 2005/0209413 A1 | 9/2005 | Labauze et al. | |
| 2006/0173118 A1 * | 8/2006 | Hochi et al. | 524/492 |
| 2007/0149688 A1 | 6/2007 | Hochi | |
| 2008/0289740 A1 | 11/2008 | Mori et al. | |
| 2009/0247696 A1 | 10/2009 | Fujii et al. | |
| 2010/0048806 A1 | 2/2010 | Inagaki et al. | |
| 2010/0056703 A1 * | 3/2010 | Oshima | 524/547 |
| 2010/0056709 A1 | 3/2010 | Oshima | |
| 2010/0056710 A1 | 3/2010 | Oshima | |
| 2010/0056712 A1 | 3/2010 | Oshima | |
| 2010/0056713 A1 | 3/2010 | Oshima | |
| 2010/0144954 A1 | 6/2010 | Kikuchi et al. | |
| 2010/0184908 A1 | 7/2010 | Kikuchi et al. | |
| 2010/0296376 A1 | 11/2010 | Narita | |
| 2011/0166254 A1 | 7/2011 | Nishimura | |
| 2011/0237737 A1 | 9/2011 | Fujii et al. | |
| 2011/0245398 A1 | 10/2011 | Hama et al. | |
| 2012/0190771 A1 | 7/2012 | Ito et al. | |
| 2012/0283354 A1 | 11/2012 | Hattori et al. | |
| 2013/0085225 A1 | 4/2013 | Nishioka et al. | |
| 2014/0114014 A1 | 4/2014 | Tokimune et al. | |
| 2014/0213693 A1 | 7/2014 | Mabuchi et al. | |

(Continued)

FOREIGN PATENT DOCUMENTS

| | | |
|---|---|---|
| CN | 1134434 A | 10/1996 |
| CN | 1148606 A | 4/1997 |
| CN | 1386786 A | 12/2002 |
| CN | 1530379 A | 9/2004 |
| CN | 1821293 A | 8/2006 |
| CN | 1990532 A | 7/2007 |
| CN | 101113217 A | 1/2008 |
| CN | 101659729 A | 3/2010 |
| CN | 101659731 A | 3/2010 |
| CN | 101671418 A | 3/2010 |
| CN | 102093602 A | 6/2011 |

(Continued)

OTHER PUBLICATIONS

International Search Report, issued in PCT/JP2012/066210, dated Oct. 2, 2012.

*Primary Examiner* — Vickey Nerangis
(74) *Attorney, Agent, or Firm* — Birch, Stewart, Kolasch & Birch, LLP

(57) ABSTRACT

Provided are a rubber composition improving wet-grip performance and its temperature dependence while ensuring good fuel economy, and a pneumatic tire including the composition. The composition includes, per 100% by mass of a rubber component: 5-55% by mass of an aromatic vinyl compound/conjugated diene compound copolymer (A) having an aromatic vinyl compound content of at least 5% by mass but less than 15% by mass and a vinyl bond content in a conjugated diene compound moiety of 10-70 mol %; and 5-75% by mass of an aromatic vinyl compound/conjugated diene compound copolymer (B) having an aromatic vinyl compound content of at least 15% by mass but less than 30% by mass and a vinyl bond content in a conjugated diene compound moiety of 10-70 mol %, and also includes, per 100 parts by mass of the rubber component, 10-150 parts by mass of a silica having a $N_2SA$ of 40-400 $m^2/g$.

8 Claims, No Drawings

(56) References Cited

U.S. PATENT DOCUMENTS

| | | |
|---|---|---|
| 2014/0213714 A1 | 7/2014 | Ono et al. |
| 2014/0228501 A1 | 8/2014 | Ono et al. |
| 2014/0233693 A1 | 8/2014 | Wang et al. |
| 2014/0256847 A1 | 9/2014 | Sato et al. |
| 2014/0275430 A1 | 9/2014 | Ishino et al. |
| 2014/0296376 A1 | 10/2014 | Sato et al. |
| 2014/0329930 A1* | 11/2014 | Sato ............ 523/156 |
| 2014/0329931 A1 | 11/2014 | Sato |

FOREIGN PATENT DOCUMENTS

| | | | |
|---|---|---|---|
| CN | 102093605 A | 6/2011 | |
| CN | 102108141 A | 6/2011 | |
| CN | 102603975 A | 7/2012 | |
| CN | 103003346 A | 3/2013 | |
| EP | 0 585 012 A1 | 3/1994 | |
| EP | 0 881 101 A1 | 12/1998 | |
| EP | 1 484 362 A1 | 12/2004 | |
| EP | 1 803 770 A2 | 7/2007 | |
| EP | 1 925 636 A1 | 5/2008 | |
| EP | 2 196 324 A1 | 6/2010 | |
| EP | 2 223 959 A1 | 9/2010 | |
| EP | 2 236 554 A1 | 10/2010 | |
| EP | 2 329 964 A1 | 6/2011 | |
| EP | 2 338 698 A1 | 6/2011 | |
| EP | 2 338 919 A1 | 6/2011 | |
| EP | 2 366 557 A1 | 9/2011 | |
| EP | 2 366 558 A1 | 9/2011 | |
| EP | 2 404 944 A1 | 1/2012 | |
| JP | 48-17674 B1 | 5/1973 | |
| JP | 56-131640 A | 10/1981 | |
| JP | 63-99252 A | 4/1988 | |
| JP | S63-99249 A | 4/1988 | |
| JP | 8-193147 A | 7/1996 | |
| JP | 8-231766 A | 9/1996 | |
| JP | 8-253520 A | 10/1996 | |
| JP | 2000-239444 A | 9/2000 | |
| JP | 2000-344955 A | 12/2000 | |
| JP | 2001-151940 A | 6/2001 | |
| JP | 2004-137463 A | 5/2004 | |
| JP | 2004-277696 A | 10/2004 | |
| JP | 2004-331940 A | 11/2004 | |
| JP | 2006-182940 A | 7/2006 | |
| JP | 2006/233177 A | 9/2006 | |
| JP | 2006-233177 A | 9/2006 | |
| JP | 2006-257260 A | 9/2006 | |
| JP | 2007-197671 A | 8/2007 | |
| JP | 2008-101158 A | 5/2008 | |
| JP | 2009-1721 A | 1/2009 | |
| JP | 2009-35643 A | 2/2009 | |
| JP | 2010-77412 A | 4/2010 | |
| JP | 2010-77413 A | 4/2010 | |
| JP | 2010-77414 A | 4/2010 | |
| JP | 2010-254852 A | 11/2010 | |
| JP | 2011-79913 A | 4/2011 | |
| JP | 2011-144324 A | 7/2011 | |
| JP | 2012-167257 A | 9/2012 | |
| WO | WO 2009/048006 A1 | 4/2009 | |
| WO | WO 2010/116988 A1 | 10/2010 | |
| WO | WO 2011/087004 A1 | 7/2011 | |
| WO | WO 2012/011571 A1 | 1/2012 | |

\* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

With the recent increase in concern about environmental issues, the demand on automobiles for better fuel economy is increasing. Better fuel economy is also being required of rubber compositions used for automotive tires. For example, rubber compositions containing a conjugated diene polymer (e.g. polybutadiene, butadiene-styrene copolymer) and a filler (e.g. carbon black, silica) are used for automotive tires.

Patent Literature 1 proposes a method for improving fuel economy; this method uses a diene rubber (modified rubber) that is modified by an organosilicon compound containing an amino group and an alkoxy group. Although this method enables to improve fuel economy, it unfortunately does not achieve sufficient grip performance on wet road surfaces or in cold regions. Thus, the method needs improvement for ensuring safety. Moreover, automotive tires need to achieve stable wet-grip performance all year round to ensure safety. Thus, improvements are required in wet-grip performance and the temperature dependence of wet-grip performance, as well as in fuel economy.

CITATION LIST

Patent Literature 1: JP 2000-344955 A

SUMMARY OF INVENTION

Technical Problem

An object of the present invention is to solve the problems identified above by providing a rubber composition capable of improving wet-grip performance and the temperature dependence of wet-grip performance while ensuring good fuel economy, and by providing a pneumatic tire including the rubber composition.

Solution to Problem

The present invention relates to a rubber composition including, based on 100% by mass of a rubber component: 5 to 55% by mass of a copolymer (A) of an aromatic vinyl compound and a conjugated diene compound, the copolymer (A) having an aromatic vinyl compound content of at least 5% by mass but less than 15% by mass and a vinyl bond content in a conjugated diene compound moiety of 10 to 70 mol %; and 5 to 75% by mass of a copolymer (B) of an aromatic vinyl compound and a conjugated diene compound, the copolymer (B) having an aromatic vinyl compound content of at least 15% by mass but less than 30% by mass and a vinyl bond content in a conjugated diene compound moiety of 10 to 70 mol %, and the rubber composition including, for each 100 parts by mass of the rubber component, 10 to 150 parts by mass of a silica having a nitrogen adsorption specific surface area of 40 to 400 $m^2/g$.

Preferably, the rubber composition includes, based on 100% by mass of the rubber component, 5 to 50% by mass of a copolymer (C) of an aromatic vinyl compound and a conjugated diene compound, the copolymer (C) having an aromatic vinyl compound content of at least 30% by mass but less than 45% by mass and a vinyl bond content in a conjugated diene compound moiety of 10 to 70 mol %.

Preferably, at least one of the copolymers (A), (B), and (C) is obtained by polymerizing a monomer component including a conjugated diene compound and a silicon-containing vinyl compound in the presence of a polymerization initiator represented by the following formula (I):

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer.

$R^{11}$ in the formula (I) is preferably a group represented by the following formula (Ia):

wherein $R^{14}$ represents a hydrocarbylene group including at least one of a structural unit derived from a conjugated diene compound and a structural unit derived from an aromatic vinyl compound; and n represents an integer of 1 to 10.

$R^{14}$ in the formula (Ia) is preferably a hydrocarbylene group including from one to ten isoprene-derived structural unit(s).

The silicon-containing vinyl compound is preferably a compound represented by the following formula (II):

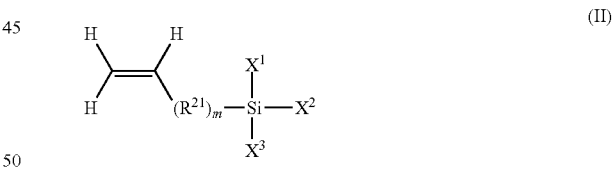

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

The silica preferably includes silica (1) having a nitrogen adsorption specific surface area of at least 50 $m^2/g$ but less than 120 $m^2/g$, and silica (2) having a nitrogen adsorption specific surface area of not less than 120 $m^2/g$.

Preferably, the nitrogen adsorption specific surface areas and amounts of the silica (1) and the silica (2) satisfy the following inequalities:

(Nitrogen adsorption specific surface area of silica (2))/(Nitrogen adsorption specific surface area of silica (1))≥1.4, and (Amount of silica (1))×0.06≤(Amount of silica (2))≤ (Amount of silica (1))×15.

The present invention also relates to a pneumatic tire, formed from the rubber composition.

Advantageous Effects of Invention

The rubber composition of the present invention is a rubber composition including a specific amount of a polymer of an aromatic vinyl compound and a conjugated diene compound and a specific amount of silica. Thus, the rubber composition enables to provide a pneumatic tire that achieves excellent wet-grip performance in a wide temperature range as well as good fuel economy. The pneumatic tire of the present invention is capable of achieving high wet-grip performance all year round, and is thus excellent in safety.

DESCRIPTION OF EMBODIMENTS

The rubber composition of the present invention includes, based on 100% by mass of the rubber component: 5 to 55% by mass of a copolymer (A) of an aromatic vinyl compound and a conjugated diene compound (hereinafter, also referred to as copolymer (A)), the copolymer (A) having an aromatic vinyl compound content of at least 5% by mass but less than 15% by mass and a vinyl bond content in a conjugated diene compound moiety of 10 to 70 mol %; and 5 to 75% by mass of a copolymer (B) of an aromatic vinyl compound and a conjugated diene compound (hereinafter, also referred to as copolymer (B)), the copolymer (B) having an aromatic vinyl compound content of at least 15% by mass but less than 30% by mass and a vinyl bond content in a conjugated diene compound moiety of 10 to 70 mol %, and also includes, for each 100 parts by mass of the rubber component, 10 to 150 parts by mass of a silica having a nitrogen adsorption specific surface area of 40 to 400 $m^2/g$.

In the case of using only one kind of polymer as a rubber component, the wet-grip performance becomes more temperature dependent. Thus, the wet-grip performance may greatly deteriorate depending on seasons. Moreover, in the case of simply using plural kinds of polymers in combination, it is difficult to achieve a balanced improvement in the fuel economy, wet-grip performance, and the temperature dependence of wet-grip performance. In contrast, the rubber composition of the present invention that includes the copolymers (A) and (B), each containing an aromatic vinyl compound in an amount within a specific range, in combination is capable of achieving balanced improvements in all the properties, fuel economy, wet-grip performance, and temperature dependence of wet-grip performance, at high levels. Moreover, the rubber composition of the present invention can also achieve good processability, rubber strength, and handling stability in addition to the properties.

The copolymer (A) has an aromatic vinyl compound content of not less than 5% by mass, and preferably not less than 10% by mass. If the aromatic vinyl compound content is less than 5% by mass, the effect producible by aromatic vinyl compounds tends not to be exerted, and the wet-grip performance tends to decrease. The copolymer (A) has an aromatic vinyl compound content of less than 15% by mass. If the aromatic vinyl compound content is not less than 15% by mass, the improving effect producible by the combination use with the copolymer (B) is not obtained.

The aromatic vinyl compound content can be determined by a method described in Examples.

The copolymer (B) has an aromatic vinyl compound content of not less than 15% by mass, and preferably not less than 20% by mass. If the aromatic vinyl compound content is less than 15% by mass, the improving effect producible by the combination use with the copolymer (A) is not obtained. The copolymer (B) has an aromatic vinyl compound content of less than 30% by mass. If the aromatic vinyl compound content is not less than 30% by mass, the compatibility with copolymer (A) deteriorates so that the fuel economy may deteriorate.

If the difference between the aromatic vinyl compound content of the copolymer (A) and that of the copolymer (B) is small, the effect producible by the combination use of these copolymers decreases so that the wet-grip performance tends to be more temperature dependent. Thus, the difference between the aromatic vinyl compound content of the copolymer (A) and that of the copolymer (B) is preferably not less than 7% by mass, and more preferably not less than 10% by mass.

The rubber composition of the present invention preferably contains a copolymer (C) having an aromatic vinyl compound content of at least 30% by mass but less than 45% by mass and a vinyl bond content in a conjugated diene compound moiety of 10 to 70 mol % (hereinafter, also referred to as copolymer (C)) in addition to the copolymers (A) and (B). This improves the temperature dependence of wet-grip performance so that excellent wet-grip performance can be achieved in a wide temperature range.

The copolymer (C) has an aromatic vinyl compound content of not less than 30% by mass, and preferably not less than 35% by mass. If the aromatic vinyl compound content is less than 30% by mass, the improving effect producible by the combination use with the copolymer (B) is not obtained. The copolymer (C) has an aromatic vinyl compound content of less than 45% by mass. If the aromatic vinyl compound content is not less than 45% by mass, the compatibility with the copolymers (A) and (B) deteriorates so that the fuel economy may deteriorate.

The copolymers (A), (B), and (C) each have a vinyl bond content in a conjugated diene compound moiety of not less than 10 mol %, and preferably not less than 20 mol %. If the vinyl bond content is less than 10 mol %, the copolymers (A), (B), and (C) each are less reactive with a silane coupling agent so that the fuel economy tends to deteriorate. The vinyl bond content is not more than 70 mol %, and preferably not more than 60 mol %. If the vinyl bond content is more than 70 mol %, a rubber composition to be finally obtained has an excessively high glass transition temperature so that the fuel economy tends to deteriorate.

The vinyl bond content can be determined by a method described in Examples.

The rubber component includes the copolymer (A) in an amount of not less than 5% by mass, preferably not less than 10% by mass, based on 100% by mass of the rubber component. If the amount is less than 5% by mass, the improving effect producible by the copolymer (A) tends not to be sufficiently achieved. The amount is not more than 55% by mass, and preferably not more than 50% by mass. If the amount is more than 55% by mass, the amount of the copolymer (B) becomes small so that the temperature dependence of wet-grip performance tends to increase.

The rubber component includes the copolymer (B) in an amount of not less than 5% by mass, preferably not less than 10% by mass, based on 100% by mass of the rubber component. If the amount is less than 5% by mass, the improving effect producible by the copolymer (B) tends not to be sufficiently achieved. The amount is not more than 75% by mass, and preferably not more than 70% by mass. If the amount is more than 75% by mass, the amount of the copolymer (A) becomes small so that the temperature dependence of wet-grip performance tends to increase.

The rubber component preferably includes the copolymer (C) in an amount of not less than 5% by mass, more preferably not less than 10% by mass, based on 100% by mass of the rubber component. If the amount is less than 5% by mass, the improving effect producible by the copolymer (C) tends not to be sufficiently achieved. The amount is preferably not more than 50% by mass, and more preferably not more than 45% by mass. If the amount is more than 50% by mass, the amounts of the copolymers (A) and (B) become small so that the temperature dependence of wet-grip performance tends to increase.

The rubber component preferably includes the copolymers (A), (B), and (C) in a combined amount of not less than 70% by mass, more preferably not less than 80% by mass, based on 100% by mass of the rubber component. If the combined amount is less than 70% by mass, the wet-grip performance tends not to be sufficiently improved. The combined amount is preferably not more than 90% by mass, and more preferably not less than 85% by mass. A combined amount of the copolymers (A), (B), and (C) of more than 90% by mass results in poor mixing and kneading processability so that the productivity tends to deteriorate.

The molecular weight distributions of the copolymers (A), (B), and (C) each are preferably 1 to 5, and more preferably 1 to 2 for enhancing the fuel economy.

The molecular weight distribution is obtained by measuring a number-average molecular weight (Mn) and a weight-average molecular weight (Mw) using gel permeation chromatography (GPC), and dividing Mw by Mn.

The copolymers (A), (B), and (C) each are obtainable by polymerizing an aromatic vinyl compound and a conjugated diene compound, which are monomers, in the presence of a polymerization initiator. Examples of the aromatic vinyl compound include styrene, p-methylstyrene, m-methylstyrene, p-tert-butylstyrene, α-methylstyrene, chloromethylstyrene, and vinyl toluene, among which styrene is preferred. Examples of the conjugated diene compound include 1,3-butadiene, isoprene, 1,3-pentadiene, and 2,3-dimethylbutadiene, among which 1,3-butadiene is preferred. That is, the copolymers (A), (B), and (C) each are preferably styrene butadiene rubber (SBR) obtained by copolymerizing styrene and 1,3-butadiene.

In view of further improving the fuel economy and wet-grip performance and of achieving good processability, rubber strength, and handling stability, preferably at least one of the copolymers (A), (B), and (C) is terminally modified by a compound containing a nitrogen atom and/or a silicon atom. More preferably, at least one of the copolymers (A), (B), and (C) is a copolymer (hereinafter, also referred to as modified copolymer) obtained by polymerizing a monomer component including a conjugated diene compound and a silicon-containing vinyl compound in the presence of a polymerization initiator represented by the following formula (I):

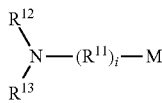

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom; and M represents an alkali metal atom, to produce a copolymer, and then reacting a compound containing a nitrogen atom and/or a silicon atom with an active terminal of the copolymer. In view of improving the fuel economy more, the copolymer (A) is preferably the modified copolymer.

As used herein, the hydrocarbyl group denotes a monovalent group provided by removing one hydrogen atom from a hydrocarbon; the hydrocarbylene group denotes a divalent group provided by removing two hydrogen atoms from a hydrocarbon; the hydrocarbyloxy group denotes a monovalent group provided by replacing the hydrogen atom of a hydroxy group with a hydrocarbyl group; the substituted amino group denotes a group provided by replacing at least one hydrogen atom of an amino group with a monovalent atom other than a hydrogen atom or with a monovalent group, or denotes a group provided by replacing two hydrogen atoms of an amino group with a divalent group; the hydrocarbyl group having a substituent (hereinafter, also referred to as substituted hydrocarbyl group) denotes a monovalent group provided by replacing at least one hydrogen atom of a hydrocarbyl group with a substituent; and the hydrocarbylene group containing a hetero atom (hereinafter, also referred to as hetero atom-containing hydrocarbylene group) denotes a divalent group provided by replacing a hydrogen atom and/or a carbon atom other than the carbon atoms from which a hydrogen atom has been removed in a hydrocarbylene group with a group containing a hetero atom (an atom other than carbon and hydrogen atoms).

As used herein, the term "modifying" means bonding a copolymer derived from a diene compound alone or with an aromatic vinyl compound, to a compound other than the compounds. The above modified copolymer has a structure in which a polymerization initiation terminal is modified by the polymerization initiator represented by the formula (I); a main chain is modified by copolymerization with a silicon-containing vinyl compound; and a termination terminal is modified by a compound containing a nitrogen atom and/or a silicon atom, a silicon-containing vinyl compound. This structure enables to disperse silica well and thus achieve a balanced improvement in the fuel economy, rubber strength, wet-grip performance, and handling stability. In general, the use of a modified rubber in which all of an initiation terminal, a main chain and a termination terminal are modified tends to greatly deteriorate the processability. In contrast, the use of the modified copolymer in which each of an initiation terminal, a main chain and a termination terminal is modified by a specific compound enables to ensure good processability, and furthermore, enables to synergistically enhance the effects of improving the fuel economy, rubber strength, wet-grip performance, and handling stability.

In the formula (I), i is 0 or 1, and preferably 1.

$R^{11}$ in the formula (I) is a $C_{1-100}$ hydrocarbylene group, preferably a $C_{6-100}$ hydrocarbylene group, and more preferably a $C_{7-80}$ hydrocarbylene group. If the $R^{11}$ has more than 100 carbon atoms, the polymerization initiator has an increased molecular weight, which may reduce the cost efficiency and the workability during the polymerization.

Plural kinds of compounds different in the carbon number of $R^{11}$ may be used in combination as the polymerization initiator represented by the formula (I).

$R^{11}$ in the formula (I) is preferably a group represented by the following formula (Ia):

(Ia)

wherein $R^{14}$ represents a hydrocarbylene group including a structural unit derived from a conjugated diene compound and/or a structural unit derived from an aromatic vinyl compound; and n represents an integer of 1 to 10.

$R^{14}$ in the formula (Ia) represents a hydrocarbylene group including a structural unit derived from a conjugated diene compound and/or a structural unit derived from an aromatic vinyl compound, preferably a hydrocarbylene group including an isoprene-derived structural unit, and more preferably a hydrocarbylene group including from one to ten isoprene-derived structural unit(s).

The number of the structural unit derived from a conjugated diene compound and/or the structural unit derived from an aromatic vinyl compound in $R^{14}$ is preferably from one to ten, and more preferably from one to five.

In the formula (Ia), n represents an integer of 1 to 10, and preferably an integer of 2 to 4.

Examples of $R^{11}$ include a group obtained by bonding from one to ten isoprene-derived structural unit(s) and a methylene group, a group obtained by bonding from one to ten isoprene-derived structural unit(s) and an ethylene group, and a group obtained by bonding from one to ten isoprene-derived structural unit(s) and a trimethylene group; and preferably a group obtained by bonding from one to ten isoprene-derived structural unit(s) and a trimethylene group.

In the formula (I), $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one, as a hetero atom, selected from the group consisting of a silicon atom, a nitrogen atom, and an oxygen atom.

The optionally substituted hydrocarbyl group is a hydrocarbyl group or substituted hydrocarbyl group. Examples of the substituent in the substituted hydrocarbyl group include a substituted amino group and a hydrocarbyloxy group. Examples of the hydrocarbyl group include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-octyl group, and an n-dodecyl group; cyclic alkyl groups such as a cyclopentyl group and a cyclohexyl group; and aryl groups such as a phenyl group and a benzyl group, and preferably acyclic alkyl groups, and more preferably $C_{1-4}$ acyclic alkyl groups. Examples of the substituted hydrocarbyl group in which the substituent is a substituted amino group include an N,N-dimethylaminomethyl group, a 2-N,N-dimethylaminoethyl group, and a 3-N,N-dimethylaminopropyl group. Examples of the substituted hydrocarbyl group in which the substituent is a hydrocarbyloxy group include a methoxymethyl group, a methoxyethyl group, and an ethoxymethyl group. Among the above examples, a hydrocarbyl group is preferable; a $C_{1-4}$ acyclic alkyl group is more preferable; and a methyl group or an ethyl group is still more preferable.

Examples of the trihydrocarbylsilyl group include a trimethylsilyl group, and a tert-butyl-dimethylsilyl group. A trimethylsilyl group is preferable.

The hydrocarbylene group optionally containing at least one, as a hetero atom, selected from the group consisting of a silicon atom, a nitrogen atom, and an oxygen atom is a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene group in which the hetero atom is at least one selected from the group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, a pent-2-ene-1,5-diyl group, and a 2,2,4-trimethylhexane-1,6-diyl group; and alkenediyl groups such as a pent-2-ene-1,5-diyl group, and preferably alkylene groups, and more preferably $C_{4-7}$ alkylene groups. Examples of the hetero atom-containing hydrocarbylene group in which the hetero atom is a silicon atom include a group represented by —$Si(CH_3)_2$—$CH_2$—$CH_2$—$Si(CH_3)_2$—. Examples of the hetero atom-containing hydrocarbylene group in which the hetero atom is a nitrogen atom include a group represented by —CH=N—CH=CH— and a group represented by —CH=N—$CH_2$—$CH_2$—. Examples of the hetero atom-containing hydrocarbylene group in which the hetero atom is an oxygen atom include a group represented by —$CH_2$—$CH_2$—O—$CH_2$—$CH_2$—. Among the above examples, a hydrocarbylene group is preferable; a $C_{4-7}$ alkylene group is more preferable; and a tetramethylene group, a pentamethylene group, and a hexamethylene group are still more preferable.

Preferably, $R^{12}$ and $R^{13}$ each are a hydrocarbyl group, or $R^{12}$ and $R^{13}$ are bonded to each other to form a hydrocarbylene group. More preferably, $R^{12}$ and $R^{13}$ each are a $C_{1-4}$ acyclic alkyl group, or $R^{12}$ and $R^{13}$ are bonded to each other to form a $C_{4-7}$ alkylene group. Still more preferably, $R^{12}$ and $R^{13}$ each are a methyl group or an ethyl group.

M in the formula (I) represents an alkali metal atom. Examples of the alkali metal atom include Li, Na, K, and Cs; and a preferable example thereof is Li.

The polymerization initiator represented by the formula (I) in which i is 1 may be a compound formed from one to five isoprene-derived structural unit(s) polymerized with an aminoalkyllithium compound. Examples of the aminoalkyllithium compound include N,N-dialkylaminoalkyllithiums such as 3-(N,N-dimethylamino)-1-propyllithium, 3-(N,N-diethylamino)-1-propyllithium, 3-(N,N-di-n-butylamino)-1-propyllithium, 4-(N,N-dimethylamino)-1-butyllithium, 4-(N,N-diethylamino)-1-butyllithium, 4-(N,N-di-n-propylamino)-1-butyllithium, and 3-(N,N-di-n-butylamino)-1-butyllithium; hetero atom-free cyclic aminoalkyllithium compounds such as 3-(1-pyrrolidino)-1-propyllithium, 3-(1-piperidino)-1-propyllithium, 3-(1-hexamethyleneimino)-1-propyllithium, and 3-[1-(1,2,3,6-tetrahydropyridino)]-1-propyllithium; and hetero atom-containing cyclic aminoalkyllithium compounds such as 3-(1-morpholino)-1-propyllithium, 3-(1-imidazolyl)-1-propyllithium, 3-(4,5-dihydro-1-imidazolyl)-1-propyllithium, and 3-(2,2,5,5-tetramethyl-1-aza-2,5-disila-1-cyclopentyl)-1-propyllithium, and preferably N,N-dialkylaminoalkyllithium, and more preferably 3-(N,N-dimethylamino)-1-propyllithium or 3-(N,N-diethylamino)-1-propyllithium.

Examples of the polymerization initiator represented by the formula (I) in which i is 0 include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium di-2-ethylhexylamide, lithium didecylamide, lithium-N-methylpiperadide, lithium ethylpropylamide, lithium ethylbutylamide, lithium methylbutylamide, lithium ethylbenzylamide, and lithium methylphenethylamide.

The polymerization initiator represented by the formula (I) in which i is 0 may be prepared in advance from a secondary amine and a hydrocarbyllithium compound before it is used for the polymerization reaction, or may be prepared in the polymerization system. Examples of the secondary amine include dimethylamine, diethylamine, dibutylamine, dioctylamine, dicyclohexylamine, and diisobutylamine. Other examples thereof include cyclic amines, such as azacycloheptane (i.e. hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-azacyclotetradecane, 4-dodecyl-1-azacyclooctane, 4-(2-phenylbutyl)-1-azacyclooctane, 3-ethyl-5-cyclohexyl-1-azacycloheptane, 4-hexyl-1-azacycloheptane, 9-isoamyl-1-azacycloheptadecane, 2-methyl-1-azacycloheptadec-9-ene, 3-isobutyl-1-azacyclododecane, 2-methyl-7-t-butyl-1-azacyclododecane, 5-nonyl-1-azacyclododecane, 8-(4-methylphenyl)-5-pentyl-3-azabicyclo[5.4.0]undecane, 1-butyl-6-azabicyclo[3.2.1]octane, 8-ethyl-3-azabicyclo[3.2.1]octane, 1-propyl-3-azabicyclo[3.2.2]nonane, 3-(t-butyl)-7-azabicyclo[4.3.0]nonane, and 1,5,5-trimethyl-3-azabicyclo[4.4.0]decane.

The polymerization initiator represented by the formula (I) is preferably a compound in which i is 1, more preferably a compound formed from one to five isoprene-derived structural unit(s) polymerized with N,N-aminoalkyllithium, and still more preferably a compound formed from one to five isoprene-derived structural unit(s) polymerized with 3-(N,N-dimethylamino)-1-propyllithium or 3-(N,N-diethylamino)-1-propyllithium.

The amount of the polymerization initiator represented by the formula (I) to be used is preferably 0.01 to 15 mmol, and more preferably 0.1 to 10 mmol, for each 100 g of the monomer component used in the polymerization.

In the present invention, other polymerization initiators, such as n-butyllithium, may be used in combination, if necessary.

Examples of the conjugated diene compound include 1,3-butadiene, isoprene, 1,3-pentadiene, 2,3-dimethyl-1,3-butadiene, 1,3-hexadiene, and myrcene. Any of these may be used alone or two or more of these may be used in combination. In view of easy availability, the conjugated diene compound is preferably 1,3-butadiene or isoprene.

The silicon-containing vinyl compound is preferably a compound represented by the following formula (II):

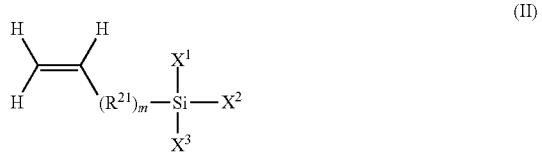

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

Here, m in the formula (II) is 0 or 1, and preferably 0.

Examples of the hydrocarbylene group in the formula (II) include an alkylene group, an alkenediyl group, an arylene group, and a group in which an arylene group and an alkylene group are bonded. Examples of the alkylene group include a methylene group, an ethylene group, and a trimethylene group. Examples of the alkenediyl group include a vinylene group and an ethylene-1,1-diyl group. Examples of the arylene group include a phenylene group, a naphthylene group, and a biphenylene group. Examples of the group in which an arylene group and an alkylene group are bonded include a group in which a phenylene group and a methylene group are bonded, and a group in which a phenylene group and an ethylene group are bonded.

$R^{21}$ is preferably an arylene group, and more preferably a phenylene group.

In the formula (II), $X^1$, $X^2$ and $X^3$ each are a substituted amino group, a hydrocarbyloxy group, or an optionally substituted hydrocarbyl group. Preferably, at least one of $X^1$, $X^2$ and $X^3$ is a substituted amino group. More preferably, two of $X^1$, $X^2$ and $X^3$ are substituted amino groups.

In the formula (II), the substituted amino group is preferably a group represented by the following formula (IIa):

(IIa)

wherein $R^{22}$ and $R^{23}$ each represent an optionally substituted hydrocarbyl group or a trihydrocarbylsilyl group, or $R^{22}$ and $R^{23}$ are bonded to each other to form a hydrocarbylene group optionally containing a nitrogen atom and/or an oxygen atom as a hetero atom.

The optionally substituted hydrocarbyl group in the formula (IIa) is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include acyclic alkyl groups such as a methyl group, an ethyl group, an n-propyl group, an isopropyl group, an n-butyl group, an isobutyl group, a sec-butyl group, a tert-butyl group, an n-pentyl group, an n-hexyl group, and an n-octyl group; cyclic alkyl groups such as a cyclopentyl group and a cyclohexyl group; and aryl groups such as a phenyl group, a benzyl group, and a naphthyl group. The hydrocarbyl group is preferably a acyclic alkyl group, and more preferably a methyl group or an ethyl group. Examples of the substituted hydrocarbyl group in which the substituent is a hydrocarbyloxy group include alkoxyalkyl groups such as a methoxymethyl group, an ethoxymethyl group, and a methoxyethyl group; and aryloxyalkyl groups such as a phenoxymethyl group.

Examples of the trihydrocarbylsilyl group in the formula (IIa) include trialkylsilyl groups such as a trimethylsilyl group, a triethylsilyl group, and a tert-butyldimethylsilyl group.

The hydrocarbylene group optionally containing a nitrogen atom and/or an oxygen atom as a hetero atom in the formula (IIa) is a hydrocarbylene group, or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hydrocarbylene group containing a nitrogen atom as a hetero atom, and a hydrocarbylene group containing an oxygen atom as a hetero atom. Examples of the hydrocarbylene group include alkylene groups such as a trimethylene group, a tetramethylene group, a pentamethylene group, a hexamethylene group, a heptamethylene group, an octamethylene group, a decamethylene group, a dodecamethylene group, and a 2,2,4-trimethylhexane-1,6-diyl group; and alkenediyl groups such as a pent-2-ene-1,5-diyl group. Examples of the hetero atom-containing hydrocarbylene group in which the hetero atom is a nitrogen atom include a group represented by —CH=N—CH=CH— and a group represented by —CH=N—CH$_2$—CH$_2$—. Examples of the hetero atom-containing hydrocarbylene group in which the hetero atom is an oxygen atom include a group represented by —CH$_2$—CH$_2$—O—CH$_2$—CH$_2$—.

Preferably, $R^{22}$ and $R^{23}$ each are an alkyl group, or $R^{22}$ and $R^{23}$ are bonded to each other to form an alkylene group. $R^{22}$ and $R^{23}$ each are more preferably an alkyl group, and still more preferably a methyl group or an ethyl group.

Examples of the substituted amino group represented by the formula (IIa) in which $R^{22}$ and $R^{23}$ each are a hydrocarbyl group include dialkylamino groups such as a dimethylamino group, a diethylamino group, an ethylmethylamino group, a di-n-propylamino group, a diisopropylamino group, a di-n-butylamino group, a diisobutylamino group, a di-sec-butylamino group, and a di-tert-butylamino group; and diarylamino groups such as a diphenylamino group. Preferable examples thereof include dialkylamino groups, and more preferable examples thereof include dimethylamino groups, diethylamino groups, and di-n-butylamino groups. Examples of the substituted amino group in which $R^{22}$ and $R^{23}$ each are a substituted hydrocarbyl group in which the substituent is a hydrocarbyloxy group include di(alkoxyalkyl)amino groups such as a di(methoxymethyl)amino group and a di(ethoxymethyl)amino group. Examples of the substituted amino group in which $R^{22}$ and $R^{23}$ each are a trihydrocarbylsilyl group include trialkylsilyl group-containing amino groups such as a bis(trimethylsilyl)amino group, a bis(tert-butyldimethylsilyl)amino group, and an N-trimethylsilyl-N-methylamino group.

Examples of the substituted amino group represented by the formula (IIa) in which $R^{22}$ and $R^{23}$ are bonded to each other to form a hydrocarbylene group include 1-alkyleneimino groups such as a 1-trimethyleneimino group, a 1-pyrrolidino group, a 1-piperidino group, a 1-hexamethyleneimino group, a 1-heptamethyleneimino group, a 1-octamethyleneimino group, a 1-decamethyleneimino group, and a 1-dodecamethyleneimino group. Examples of the substituted amino group in which $R^{22}$ and $R^{23}$ are bonded to each other to form a hydrocarbylene group containing a nitrogen atom as a hetero atom include a 1-imidazolyl group and a 4,5-dihydro-1-imidazolyl group. Examples of the substituted amino group in which $R^{22}$ and $R^{23}$ are bonded to each other to form a hydrocarbylene group containing an oxygen atom as a hetero atom include a morpholino group.

The substituted amino group represented by the formula (IIa) is preferably a dialkylamino group or a 1-alkyleneimino group; more preferably a dialkylamino group; and still more preferably a dimethylamino group, a diethylamino group, or a di-n-butylamino group.

Examples of the hydrocarbyloxy group in the formula (II) include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group.

The optionally substituted hydrocarbyl group in the formula (II) is a hydrocarbyl group or a substituted hydrocarbyl group. Examples of the substituted hydrocarbyl group include a substituted hydrocarbyl group in which the substituent is a hydrocarbyloxy group. Examples of the hydrocarbyl group include alkyl groups such as a methyl group, an ethyl group, an n-propyl group, an isopropyl group, an n-butyl group, a sec-butyl group, and a tert-butyl group; and aryl groups such as a phenyl group, a 4-methyl-1-phenyl group, and a benzyl group. Examples of the substituted hydrocarbyl group in which the substituent is a hydrocarbyloxy group include alkoxyalkyl groups such as a methoxymethyl group, an ethoxymethyl group, and an ethoxyethyl group.

Examples of the silicon-containing vinyl compound represented by the formula (II) in which one of $X^1$, $X^2$, and $X^3$ is a substituted amino group, and m is 0 include (dialkylamino)dialkylvinylsilanes such as (dimethylamino)dimethylvinylsilane, (ethylmethylamino)dimethylvinylsilane, (di-n-propylamino)dimethylvinylsilane, (diisopropylamino)dimethylvinylsilane, (dimethylamino)diethylvinylsilane, (ethylmethylamino)diethylvinylsilane, (di-n-propylamino)diethylvinylsilane, and (diisopropylamino)diethylvinylsilane; [bis(trialkylsilyl)amino]dialkylvinylsilanes such as [bis(trimethylsilyl)amino]dimethylvinylsilane, [bis(t-butyldimethylsilyl)amino]dimethylvinylsilane, [bis(trimethylsilyl)amino]diethylvinylsilane, and [bis(t-butyldimethylsilyl)amino]diethylvinylsilane; (dialkylamino)di(alkoxyalkyl)vinylsilanes such as (dimethylamino)di(methoxymethyl)vinylsilane, (dimethylamino)di(methoxyethyl)vinylsilane, (dimethylamino)di(ethoxymethyl)vinylsilane, (dimethylamino)di(ethoxyethyl)vinylsilane, (diethylamino)di(methoxymethyl)vinylsilane, (diethylamino)di(methoxyethyl)vinylsilane, (diethylamino)di(ethoxymethyl)vinylsilane, and (diethylamino)di(ethoxyethyl)vinylsilane; and cyclic aminodialkylvinylsilane compounds such as pyrrolidinodimethylvinylsilane, piperidinodimethylvinylsilane, hexamethyleneiminodimethylvinylsilane, 4,5-dihydro-imidazolyldimethylvinylsilane, and morpholinodimethylvinylsilane.

Examples of the silicon-containing vinyl compound represented by the formula (II) in which one of $X^1$, $X^2$, and $X^3$ is a substituted amino group, and m is 1 include (dialkylamino)dialkylvinylphenylsilanes such as (dimethylamino)dimethyl-4-vinylphenylsilane, (dimethylamino)dimethyl-3-vinylphenylsilane, (diethylamino)dimethyl-4-vinylphenylsilane, (diethylamino)dimethyl-3-vinylphenylsilane, (di-n-propylamino)dimethyl-4-vinylphenylsilane, (di-n-propylamino)dimethyl-3-vinylphenylsilane, (di-n-butylamino)dimethyl-4-vinylphenylsilane, (di-n-butylamino)dimethyl-3-vinylphenylsilane, (dimethylamino)diethyl-4-vinylphenylsilane, (dimethylamino)diethyl-3-vinylphenylsilane, (diethylamino)diethyl-4-vinylphenylsilane, (diethylamino)diethyl-3-vinylphenylsilane, (di-n-propylamino)diethyl-4-vinylphenylsilane, (di-n-propylamino)diethyl-3-vinylphenylsilane, (di-n-butylamino)diethyl-4-vinylphenylsilane, and (di-n-butylamino)diethyl-3-vinylphenylsilane.

Examples of the silicon-containing vinyl compound represented by the formula (II) in which two of $X^1$, $X^2$, and $X^3$ each are a substituted amino group, and m is 0 include bis(dialkylamino)alkylvinylsilanes such as bis(dimethylamino)methylvinylsilane, bis(diethylamino)methylvinylsilane, bis(di-n-propylamino)methylvinylsilane, bis(di-n-butylamino)methylvinylsilane, bis(dimethylamino)ethylvinylsilane, bis(diethylamino)ethylvinylsilane, bis(di-n-propylamino)ethylvinylsilane, and bis(di-n-butylamino)ethylvinylsilane; bis[bis(trialkylsilyl)amino]alkylvinylsilanes such as bis[bis(trimethylsilyl)amino]methylvinylsilane, bis[bis(tert-butyldimethylsilyl)amino]methylvinylsilane, bis[bis(trimethylsilyl)amino]ethylvinylsilane, and bis[bis(tert-butyldimethylsilyl)amino]ethylvinylsilane; bis(dialkylamino)alkoxyalkylsilanes such as bis(dimethylamino)methoxymethylvinylsilane, bis(dimethylamino)methoxyethylvinylsilane, bis(dimethylamino)ethoxymethylvinylsilane, bis(dimethylamino)ethoxyethylvinylsilane, bis(diethylamino)

methoxymethylvinylsilane, bis(diethylamino)methoxyethylvinylsilane, bis(diethylamino)ethoxymethylvinylsilane, and bis(dimethylamino)ethoxyethylvinylsilane; and bis(cyclic amino)alkylvinylsilane compounds such as bis(pyrrolidino)methylvinylsilane, bis(piperidino)methylvinylsilane, bis(hexamethyleneimino)methylvinylsilane, bis(4,5-dihydroimidazolyl)methylvinylsilane, and bis(morpholino)methylvinylsilane.

Examples of the silicon-containing vinyl compound represented by the formula (II) in which two of $X^1$, $X^2$, and $X^3$ each are a substituted amino group, and m is 1 include bis(dialkylamino)alkylvinylphenylsilanes such as bis(dimethylamino)methyl-4-vinylphenylsilane, bis(dimethylamino)methyl-3-vinylphenylsilane, bis(diethylamino)methyl-4-vinylphenylsilane, bis(diethylamino)methyl-3-vinylphenylsilane, bis(di-n-propylamino)methyl-4-vinylphenylsilane, bis(di-n-propylamino)methyl-3-vinylphenylsilane, bis(di-n-butylamino)methyl-4-vinylphenylsilane, bis(di-n-butylamino)methyl-3-vinylphenylsilane, bis(dimethylamino)ethyl-4-vinylphenylsilane, bis(dimethylamino)ethyl-3-vinylphenylsilane, bis(diethylamino)ethyl-4-vinylphenylsilane, bis(diethylamino)ethyl-3-vinylphenylsilane, bis(di-n-propylamino)ethyl-4-vinylphenylsilane, bis(di-n-propylamino)ethyl-3-vinylphenylsilane, bis(di-n-butylamino)ethyl-4-vinylphenylsilane, and bis(di-n-butylamino)ethyl-3-vinylphenylsilane.

Examples of the silicon-containing vinyl compound represented by the formula (II) in which three of $X^1$, $X^2$, and $X^3$ each are a substituted amino group, and m is 0 include tris(dialkylamino)vinylsilanes such as tris(dimethylamino)vinylsilane, tris(diethylamino)vinylsilane, tris(di-n-propylamino)vinylsilane, and tris(di-n-butylamino)vinylsilane.

Examples of the silicon-containing vinyl compound represented by the formula (II) in which three of $X^1$, $X^2$, and $X^3$ each are a substituted amino group, and m is 1 include tris(dialkylamino)vinylphenylsilanes such as tris(dimethylamino)-4-vinylphenylsilane, tris(dimethylamino)-3-vinylphenylsilane, tris(diethylamino)-4-vinylphenylsilane, tris(diethylamino)-3-vinylphenylsilane, tris(di-n-propylamino)-4-vinylphenylsilane, tris(di-n-propylamino)-3-vinylphenylsilane, tris(di-n-butylamino)-4-vinylphenylsilane, and tris(di-n-butylamino)-3-vinylphenylsilane.

Examples of the silicon-containing vinyl compound represented by the formula (II) in which $X^1$, $X^2$, and $X^3$ are not a substituted amino group, and m is 0 include trialkoxyvinylsilanes such as trimethoxyvinylsilane, triethoxyvinylsilane, and tripropoxyvinylsilane; dialkoxyalkylvinylsilanes such as methyldimethoxyvinylsilane and methyldiethoxyvinylsilane; dialkoxyarylvinylsilanes such as di(tert-pentoxy)phenylvinylsilane and di(tert-butoxy)phenylvinylsilane; monoalkoxydialkylvinylsilanes such as dimethylmethoxyvinylsilane; monoalkoxydiarylvinylsilanes such as tert-butoxydiphenylvinylsilane and tert-pentoxydiphenylvinylsilane; monoalkoxyalkylarylvinylsilanes such as tert-butoxymethylphenylvinylsilane and tert-butoxyethylphenylvinylsilane; and substituted alkoxyvinylsilane compounds such as tris(β-methoxyethoxy)vinylsilane.

Moreover, examples of the silicon-containing vinyl compound include bis(trialkylsilyl)-aminostyrenes such as 4-N,N-bis(trimethylsilyl)aminostyrene and 3-N,N-bis(trimethylsilyl)aminostyrene; and bis(trialkylsilyl)aminoalkylstyrenes such as 4-bis(trimethylsilyl)aminomethylstyrene, 3-bis(trimethylsilyl)aminomethylstyrene, 4-bis(trimethylsilyl)aminoethylstyrene, and 3-bis(trimethylsilyl)aminoethylstyrene.

The silicon-containing vinyl compound is preferably a compound represented by the formula (II), more preferably a compound represented by the formula (II) in which m is 0, and still more preferably a compound represented by the formula (II) in which two of $X^1$, $X^2$ and $X^3$ are dialkyl amino groups.

The silicon-containing vinyl compound is particularly preferably bis(dimethylamino)methylvinylsilane, bis(diethylamino)methylvinylsilane, or bis(di-n-butylamino)methylvinylsilane.

The amount of the silicon-containing vinyl compound used in the production of the modified copolymer, when expressed based on 100% by mass of the total amount of the monomer component used in the polymerization, is preferably not less than 0.01% by mass, more preferably not less than 0.02% by mass, and still more preferably not less than 0.05% by mass, for achieving a balanced enhancement in the processability, fuel economy, rubber strength, wet-grip performance, and handling stability. The amount is preferably not more than 20% by mass, more preferably not more than 2% by mass, and still more preferably not more than 1% by mass for achieving better cost efficiency and higher rubber strength.

In the production of the modified copolymer, the monomer component may further include polymerizable monomers in addition to the aromatic vinyl compound, conjugated diene compound, and silicon-containing vinyl compound. The monomers may be, for example, vinyl nitriles and unsaturated carboxylic acid esters. Examples of the vinyl nitriles include acrylonitrile. Examples of the unsaturated carboxylic acid esters include methyl acrylate, ethyl acrylate, methyl methacrylate, and ethyl methacrylate.

In the production of the modified copolymer, polymerization is preferably performed in a hydrocarbon solvent that does not inactivate the polymerization initiator represented by the formula (I). Examples of the hydrocarbon solvent include aliphatic hydrocarbons, aromatic hydrocarbons, and alicyclic hydrocarbons. Examples of the aliphatic hydrocarbons include propane, n-butane, iso-butane, n-pentane, iso-pentane, n-hexane, n-heptane, and n-octane. Examples of the aromatic hydrocarbons include benzene, toluene, xylene, and ethylbenzene. Examples of the alicyclic hydrocarbons include cyclopentane and cyclohexane. The hydrocarbon solvent may be a mixture of different components, such as industrial hexane. It is preferably a $C_{2-12}$ hydrocarbon.

The polymerization reaction may be performed in the presence of an agent for adjusting the vinyl bond content of conjugated diene units, or an agent for adjusting the distribution of a conjugated diene unit and a monomer unit derived from a monomer other than conjugated diene in a modified copolymer chain (hereinafter, referred to collectively as "adjusting agents"). Examples of the agents include ether compounds, tertiary amine compounds, and phosphine compounds. Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amine compounds include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. One or more of them are used.

In the production of the modified copolymer, the polymerization initiator may be supplied to a polymerization reactor before the monomer component is supplied to the polymerization reactor; or the polymerization initiator may be supplied to the polymerization reactor after the whole amount of the monomer component used in polymerization is supplied to the polymerization reactor; or the polymerization initiator may be supplied to the polymerization reactor after a part of the monomer component used in polymerization is supplied to the polymerization reactor. The polymerization initiator may be supplied at once or continuously to the polymerization reactor.

In the production of the modified copolymer, the monomer component may be supplied at once, continuously, or intermittently to the polymerization reactor. Further, the monomers may be supplied individually or simultaneously to the polymerization reactor.

In the production of the modified copolymer, the polymerization temperature is usually 25 to 100° C., preferably 35 to 90° C., and more preferably 50 to 80° C. The polymerization time is usually 10 minutes to 5 hours.

The modified copolymer is obtainable by polymerizing a monomer component including an aromatic vinyl compound, a conjugated diene compound, and a silicon-containing vinyl compound in the presence of a polymerization initiator represented by the formula (I) to produce a copolymer (the active terminal of the copolymer is considered to contain an alkali metal derived from the polymerization initiator), and then reacting a compound containing a nitrogen atom and/or a silicon atom with an active terminal of the copolymer (terminal modification reaction). Specifically, the conjugated diene polymer is obtainable by adding a compound containing a nitrogen atom and/or a silicon atom to a polymerization solution and then mixing them. The amount of the compound containing a nitrogen atom and/or a silicon atom to be added to the polymerization solution is usually 0.1 to 3 mol, preferably 0.5 to 2 mol, and more preferably 0.7 to 1.5 mol, per mol of the alkali metal derived from the polymerization initiator represented by the formula (I).

The terminal modification reaction is performed usually at a temperature from 25 to 100° C., preferably from 35 to 90° C., and more preferably from 50 to 80° C. The time period for the reaction is usually 60 seconds to 5 hours, preferably 5 minutes to 1 hour, and more preferably 15 minutes to 1 hour.

Preferable examples of the compound containing a nitrogen atom and/or a silicon atom include a compound containing a nitrogen atom and a carbonyl group.

The compound containing a nitrogen atom and a carbonyl group is preferably a compound represented by the following formula (III):

(III)

wherein $R^{31}$ represents an optionally substituted hydrocarbyl group, or is joined to $R^{32}$ to form a hydrocarbylene group optionally containing a nitrogen atom and/or an oxygen atom as a hetero atom, or is joined to $R^{34}$ to form a divalent group; $R^{32}$ represents an optionally substituted hydrocarbyl group, or is joined to $R^{31}$ to form a hydrocarbylene group optionally containing a nitrogen atom and/or an oxygen atom as a hetero atom; and $R^{34}$ represents an optionally substituted hydrocarbyl group, or a hydrogen atom, or is joined to $R^{31}$ to form a divalent group; $R^{33}$ represents a divalent group; and k represents 0 or 1.

In the formula (III), the optionally substituted hydrocarbyl group in $R^{31}$, $R^{32}$ or $R^{34}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. Examples of the substituted hydrocarbyl group in which the substituent is a hydrocarbyloxy group include alkoxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-(N,N-dimethylamino)ethylphenyl group; cyclic amino group-containing alkyl groups such as a 3-pyrrolidinopropyl group, a 3-piperidinopropyl group, and a 3-imidazolylpropyl group; cyclic amino group-containing aryl groups such as a 4-pyrrolidinophenyl group, a 4-piperidinophenyl group, and a 4-imidazolylphenyl group; and cyclic amino group-containing alkylaryl groups such as a 4-pyrrolidinoethylphenyl group, a 4-piperidinoethylphenyl group, and a 4-imidazolylethylphenyl group.

In the formula (III), the hydrocarbylene group optionally containing a nitrogen atom and/or an oxygen atom as a hetero atom, formed by bonding of $R^{31}$ and $R^{32}$, is a hydrocarbylene group or a hetero atom-containing hydrocarbylene group in which the hetero atom is a nitrogen atom and/or an oxygen atom. Examples of the hetero atom-containing hydrocarbylene group in which the hetero atom is a nitrogen atom and/or an oxygen atom include a hetero atom-containing hydrocarbylene group in which the hetero atom is a nitrogen atom and a hetero atom-containing hydrocarbylene group in which the hetero atom is an oxygen atom. Examples of the hydrocarbylene group include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH=N—CH=CH— and a group represented by —CH=N—CH$_2$—CH$_2$—. Examples of the hetero atom-containing hydrocarbylene group in which the hetero atom is an oxygen atom include a group represented by —(CH$_2$)$_s$—O—(CH$_2$)$_t$— (s and t each are an integer of 1 or more).

In the formula (III), examples of the divalent group formed by bonding of $R^{31}$ and $R^{34}$, and the divalent group of $R^{33}$ include a hydrocarbylene group, a hetero atom-containing hydrocarbylene group in which the hetero atom is a nitrogen atom, a hetero atom-containing hydrocarbylene group in which the hetero atom is an oxygen atom, a group in which a hydrocarbylene group and an oxygen atom are bonded, and a group in which a hydrocarbylene group and a group represented by —NR$^{35}$— (R$^{35}$ represents a hydrocarbyl group or a hydrogen atom) are bonded. Examples of the hydrocarbylene group include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the hetero atom-containing hydrocarbylene group in which the hetero atom is a nitrogen atom include a group represented by —CH=N—CH=CH— and a group represented by —CH=N—CH$_2$—CH$_2$—. Examples of the hetero atom-containing hydrocarbylene group in which the hetero atom is an oxygen atom include a group represented by —(CH$_2$)$_s$—O—(CH$_2$)$_t$— (s and t each are an integer of 1 or more). Examples of the group in which a hydrocarbylene group and an oxygen atom are bonded include a group represented by —(CH$_2$)$_r$—O— (r represents an integer of 1 or more). Examples of the group in which a hydrocarbylene group and a group represented by —NR$^{35}$— (R$^{35}$ represents a hydrocarbyl group or a hydrogen atom) are bonded include a group represented by —(CH$_2$)$_p$—NR$^{35}$— (R$^{35}$ represents a hydrocarbyl group (preferably a C$_{1-6}$ hydrocarbyl group), or a hydrogen atom; and p represents an integer of 1 or more).

Preferable examples of a compound represented by the formula (III) include a compound represented by the formula (III) in which k is 0, and R$^{34}$ is an optionally substituted hydrocarbyl group or a hydrogen atom, represented by the following formula (IIIa):

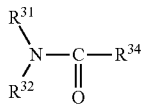

(IIIa)

wherein, R$^{13}$ represents an optionally substituted hydrocarbyl group, or is joined to R$^{32}$ to form a hydrocarbylene group optionally containing a nitrogen atom and/or an oxygen atom as a hetero atom; R$^{32}$ represents an optionally substituted hydrocarbyl group, or is joined to R$^{31}$ to form a hydrocarbylene group optionally containing a nitrogen atom and/or an oxygen atom as a hetero atom; and R$^{34}$ represents an optionally substituted hydrocarbyl group or a hydrogen atom.

In the formula (IIIa), description and examples of the optionally substituted hydrocarbyl group for R$^{31}$, R$^{32}$ or R$^{34}$, and the hydrocarbylene group optionally containing a nitrogen atom and/or an oxygen atom as a hetero atom, formed by bonding of R$^{31}$ and R$^{32}$, are the same as those stated in the description of the formula (III).

In the formula (IIIa), preferably, R$^{31}$ is a C$_{1-10}$ hydrocarbyl group, or is joined to R$^{32}$ to form a C$_{3-10}$ hydrocarbylene group or a hetero atom-containing C$_{3-10}$ hydrocarbylene group in which the hetero atom is a nitrogen atom. More preferably, R$^{31}$ is a C$_{1-10}$ alkyl group or a C$_{6-10}$ aryl group, or is joined to R$^{32}$ to form a C$_{3-10}$ alkylene group, a group represented by —CH=N—CH=CH—, or a group represented by —CH=N—CH$_2$—CH$_2$—. R$^{31}$ is still more preferably a C$_{1-6}$ alkyl group, and particularly preferably a methyl group or an ethyl group.

In the formula (IIIa), preferably, R$^{32}$ is a C$_{1-10}$ hydrocarbyl group, or is joined to R$^{31}$ to form a C$_{3-10}$ hydrocarbylene group or a hetero atom-containing C$_{3-10}$ hydrocarbylene group in which the hetero atom is a nitrogen atom. More preferably, R$^{32}$ is a C$_{1-10}$ alkyl group or a C$_{6-10}$ aryl group, or is joined to R$^{31}$ to form a C$_{3-10}$ alkylene group, a group represented by —CH=N—CH=CH—, or a group represented by —CH=N—CH$_2$—CH$_2$—. R$^{32}$ is still more preferably a C$_{1-6}$ alkyl group, and particularly preferably a methyl group or an ethyl group.

In the formula (IIIa), R$^{34}$ is preferably a hydrocarbyl group or a hydrogen atom, more preferably a C$_{1-10}$ hydrocarbyl group or a hydrogen atom, still more preferably a C$_{1-6}$ alkyl group or a hydrogen atom, and particularly preferably a hydrogen atom, a methyl group or an ethyl group.

Examples of the compound represented by the formula (IIIa) in which R$^{34}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compound represented by the formula (IIIa) in which R$^{34}$ is a hydrogen atom include N,N-dihydrocarbylformamides such as N,N-dimethylformamide, N,N-dimethylformamide, and N-methyl-N-ethylformamide.

Preferable examples of the compound represented by the formula (III) include a compound represented by the formula (III) in which k is 0; and R$^{34}$ is joined to R$^{31}$ to form a divalent group, represented by the following formula (IIIb):

(IIIb)

wherein R$^{32}$ represents an optionally substituted hydrocarbyl group; and R$^{36}$ represents a hydrocarbylene group, or a group in which a hydrocarbylene group and a group represented by —NR$^{35}$— are bonded, where R$^{35}$ represents a hydrocarbyl group or a hydrogen atom.

In the formula (IIIb), description and examples of an optionally substituted hydrocarbyl group for R$^{32}$ are the same as those stated in the description of the formula (III).

In the formula (IIIb), examples of the hydrocarbylene group for R$^{36}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group. Examples of the group in which a hydrocarbylene group and a group represented by —NR$^{35}$— (R$^{35}$ represents a hydrocarbyl group or a hydrogen atom) are bonded for R$^{36}$ include a group represented by —(CH$_2$)$_p$—NR$^{35}$— (R$^{35}$ represents a hydrocarbyl group or a hydrogen atom, and p represents an integer of 1 or more).

In the formula (IIIb), R$^{32}$ is preferably a C$_{1-10}$ hydrocarbyl group, more preferably a C$_{1-10}$ alkyl group or a C$_{6-10}$ aryl group, still more preferably a C$_{1-6}$ alkyl group or a phenyl group, and particularly preferably a methyl group, an ethyl group, or a phenyl group.

In the formula (IIIb), R$^{36}$ is preferably a C$_{1-10}$ hydrocarbylene group, or a group in which a C$_{1-10}$ hydrocarbylene group and a group represented by —NR$^{35}$— (R$^{35}$ represents a hydrocarbyl group (preferably a C$_{1-10}$ hydrocarbyl group) or a hydrogen atom) are bonded, more preferably a C$_{3-6}$ alkylene group or a group represented by —(CH$_2$)$_p$—NR$^{35}$— (R$^{35}$ represents a hydrocarbyl group (preferably a C$_{1-10}$ hydrocarbyl group), and p represents an integer of not less than 1 (preferably an integer of 2 to 5)), and further preferably a trimethylene group, a tetramethylene group, a pentamethylene group, or a group represented by —(CH$_2$)$_2$—N(CH$_3$)—.

Examples of the compound represented by the formula (IIIb) in which R$^{36}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurilolactams such as N-methyl-ω-laurilolactam and N-vinyl-ω-laurilolactam. N-phenyl-2-pyrrolidone and N-methyl-ε-caprolactam are preferable among the above examples.

Examples of the compound represented by the formula (IIIb) in which R$^{36}$ is a group in which a hydrocarbylene group and a group represented by —NR$^{35}$— (R$^{35}$ is a hydrocarbyl group or a hydrogen atom) are bonded include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Among the above examples, 1,3-dimethyl-2-imidazolidinone is preferred.

Preferable examples of the compound represented by the formula (III) include a compound represented by the formula (III) in which k is 1; and R$^{33}$ is a hydrocarbylene group, represented by the following formula (IIIc):

(IIIc)

wherein R$^{31}$ represents an optionally substituted hydrocarbyl group, or is joined to R$^{32}$ to form a hydrocarbylene group optionally containing a nitrogen atom and/or an oxygen atom as a hetero atom; R$^{32}$ represents an optionally substituted hydrocarbyl group, or is joined to R$^{31}$ to form a hydrocarbylene group optionally containing a nitrogen atom and/or an oxygen atom as a hetero atom; R$^{33}$ represents a hydrocarbylene group, and R$^{34}$ represents an optionally substituted hydrocarbyl group or a hydrogen atom.

In the formula (IIIc), description and examples of the optionally substituted hydrocarbyl group for R$^{31}$, R$^{32}$ or R$^{34}$; the hydrocarbylene group optionally containing a nitrogen atom and/or an oxygen atom as a hetero atom, formed by bonding of R$^{31}$ and R$^{32}$; and the hydrocarbylene group for R$^{33}$ are the same as those stated in the description of the formula (III).

In the formula (IIIc), R$^{33}$ is preferably a C$_{1-10}$ hydrocarbylene group, more preferably an a C$_{1-10}$ alkylene group or a C$_{6-10}$ arylene group, still more preferably a C$_{1-6}$ alkylene group or a phenylene group, and particularly preferably an ethylene group, a trimethylene group, or a 1,4-phenylene group.

In the formula (IIIc), R$^{34}$ is preferably a C$_{1-10}$ hydrocarbyl group, or a substituted C$_{1-10}$ hydrocarbyl group in which the substituent is a dialkylamino group, more preferably a C$_{1-6}$ alkyl group, a C$_{6-10}$ aryl group, a C$_{1-6}$ dialkylaminoalkyl group, or a C$_{6-10}$ dialkylaminoaryl group, and still more preferably a methyl group, an ethyl group, a phenyl group, a 3-dimethylaminoethyl group, or a 4-diethylaminophenyl group.

In the formula (IIIc), preferably R$^{31}$ is a C$_{1-10}$ hydrocarbyl group, or is joined to R$^{32}$ to form a C$_{3-10}$ hydrocarbylene group, or a hetero atom-containing C$_{3-10}$ hydrocarbylene group in which the hetero atom is a nitrogen atom or an oxygen atom; more preferably it is a C$_{1-10}$ alkyl group or a C$_{6-10}$ aryl group, or is joined to R$^{32}$ to form a C$_{3-10}$ alkylene group, a group represented by —CH═N—CH═CH—, a group represented by —CH═N—CH$_2$—CH$_2$—, or a group represented by —(CH$_2$)$_2$—O—(CH$_2$)$_2$—; still more preferably it is a C$_{1-6}$ alkyl group, or is joined to R$^{32}$ to form a C$_{3-6}$ alkylene group, a group represented by —CH═N—CH═CH—, or a group represented by —CH═N—CH$_2$—CH$_2$—; and particularly preferably it is a methyl group or an ethyl group, or is joined to R$^{32}$ to form a tetramethylene group, a hexamethylene group, or a group represented by —CH═N—CH═CH—.

In the formula (IIIc), preferably R$^{32}$ is a C$_{1-10}$ hydrocarbyl group, or is joined to R$^{31}$ to form a C$_{3-10}$ hydrocarbylene group, or a hetero atom-containing C$_{3-10}$ hydrocarbylene group in which the hetero atom is a nitrogen atom or an oxygen atom; more preferably it is a C$_{1-10}$ alkyl group or a C$_{6-10}$ aryl group, or is joined to R$^{31}$ to form a C$_{3-10}$ alkylene group, a group represented by —CH═N—CH═CH—, a group represented by —CH═N—CH$_2$—CH$_2$—, or a group represented by —(CH$_2$)$_2$—O—(CH$_2$)$_2$—; still more preferably it is a C$_{1-6}$ alkyl group, or is joined to R$^{31}$ to form a C$_{3-6}$ alkylene group, a group represented by —CH═N—CH═CH—, or a group represented by —CH═N—CH$_2$—CH$_2$—; and particularly preferably it is a methyl group or an ethyl group, or is joined to R$^{31}$ to form a tetramethylene group, a hexamethylene group, or a group represented by —CH═N—CH═CH—.

Examples of the compound represented by the formula (IIIc) in which R$^{34}$ is a hydrocarbyl group include 4-N,N-dihydrocarbylaminoacetophenones such as 4-(N,N-dimethylamino)acetophenone, 4-N-methyl-N-ethylaminoacetophenone, and 4-N,N-diethylaminoacetophenone; and 4-cyclic aminoacetophenone compounds such as 4'-(imidazol-1-yl)acetophenone and 4-pyrazolylacetophenone. Among the above examples, 4-cyclic aminoacetophenone compounds are preferable, and 4'-(imidazol-1-yl)acetophenone is more preferable.

Examples of the compound represented by the formula (IIIc) in which R$^{34}$ is a substituted hydrocarbyl group include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Among the above examples, 4,4'-bis(dihydrocarbylamino)benzophenone is preferable, and 4,4'-bis(diethylamino)benzophenone is more preferable.

Preferable examples of the compound represented by the formula (III) include a compound represented by the formula (III) in which k is 1, and R$^{33}$ is a group in which a hydrocarbylene group and an oxygen atom are bonded, or a group in which a hydrocarbylene group and a group represented by —NR$^{35}$— (R$^{35}$ represents a hydrocarbyl group or a hydrogen atom) are bonded, represented by the following formula (IIId):

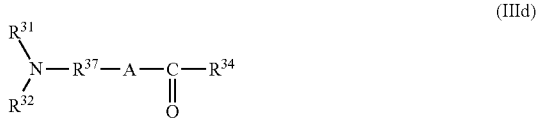

wherein $R^{31}$ represents an optionally substituted hydrocarbyl group, or is joined to $R^{32}$ to form a hydrocarbylene group optionally containing a nitrogen atom and/or an oxygen atom as a hetero atom; $R^{32}$ represents an optionally substituted hydrocarbyl group, or is joined to $R^{31}$ to form a hydrocarbylene group optionally containing a nitrogen atom and/or an oxygen atom as a hetero atom; $R^{37}$ represents a hydrocarbylene group; A represents an oxygen atom or $-NR^{35}-$ wherein $R^{35}$ represents a hydrocarbyl group or a hydrogen atom; and $R^{34}$ represents an optionally substituted hydrocarbyl group or a hydrogen atom.

In the formula (IIId), description and examples of the optionally substituted hydrocarbyl group for $R^{31}$, $R^{32}$ or $R^{34}$, and the hydrocarbylene group optionally containing a nitrogen atom and/or an oxygen atom as a hetero atom, formed by bonding of $R^{31}$ and $R^{32}$, are the same as those stated in the description of the formula (III). The hydrocarbyl group for $R^{35}$ is the same as the hydrocarbyl group for $R^{31}$, $R^{32}$, or $R^{34}$.

In the formula (IIId), A is preferably an oxygen atom or a group represented by $-NR^{35}-$ ($R^{35}$ is a hydrocarbyl group (preferably a $C_{1-5}$ hydrocarbyl group) or a hydrogen atom), more preferably an oxygen atom or a group represented by $-NH-$, and still more preferably a group represented by $-NH-$.

In the formula (IIId), examples of the hydrocarbylene group for $R^{37}$ include alkylene groups such as a trimethylene group, a tetramethylene group, a pentamethylene group, a hexamethylene group, a pentan-2-en-1,5-diyl group, and a 2,2,4-trimethylhexane-1,6-diyl group; and arylene groups such as a 1,4-phenylene group.

In the formula (IIId), $R^{34}$ is preferably a $C_{1-10}$ hydrocarbyl group, more preferably an alkenyl group having 2 to 5 carbon atoms, and still more preferably a vinyl group.

In the formula (IIId), $R^{37}$ is preferably a $C_{1-10}$ hydrocarbylene group, more preferably a $C_{1-6}$ alkylene group, still more preferably an ethylene group or a trimethylene group, and particularly preferably a trimethylene group.

In the formula (IIId), preferably $R^{31}$ is a $C_{1-10}$ hydrocarbyl group, or is joined to $R^{32}$ to form a $C_{3-10}$ hydrocarbylene group, or a hetero atom-containing $C_{3-10}$ hydrocarbylene group in which the hetero atom is a nitrogen atom or an oxygen atom; more preferably it is a $C_{1-10}$ alkyl group or a $C_{6-10}$ aryl group, or is joined to $R^{32}$ to form a $C_{3-10}$ alkylene group, a group represented by $-CH=N-CH=CH-$, a group represented by $-CH=N-CH_2-CH_2-$, or a group represented by $-(CH_2)_2-O-(CH_2)_2-$; still more preferably it is a $C_{1-6}$ alkyl group, or is joined to $R^{32}$ to form a $C_{3-6}$ alkylene group, a group represented by $-CH=N-CH=CH-$, or a group represented by $-CH=N-CH_2-CH_2-$; and particularly preferably it is a methyl group or an ethyl group, or is joined to $R^{32}$ to form a tetramethylene group, a hexamethylene group, or a group represented by $-CH=N-CH=CH-$.

In the formula (IIId), preferably $R^{32}$ is a $C_{1-10}$ hydrocarbyl group, or is joined to $R^{31}$ to form a $C_{3-10}$ hydrocarbylene group, or a hetero atom-containing $C_{3-10}$ hydrocarbylene group in which the hetero atom is a nitrogen atom or an oxygen atom; more preferably it is a $C_{1-10}$ alkyl group or a $C_{6-10}$ aryl group, or is joined to $R^{31}$ to form a $C_{3-10}$ alkylene group, a group represented by $-CH=N-CH=CH-$, a group represented by $-CH=N-CH_2-CH_2-$, or a group represented by $-(CH_2)_2-O-(CH_2)_2-$; still more preferably it is a $C_{1-6}$ alkyl group, or is joined to $R^{31}$ to form a $C_{3-6}$ alkylene group, a group represented by $-CH=N-CH=CH-$, or a group represented by $-CH=N-CH_2-CH_2-$; and particularly preferably it is a methyl group or an ethyl group, or is joined to $R^{31}$ to form a tetramethylene group, a hexamethylene group, or a group represented by $-CH=N-CH=CH-$.

Examples of the compound represented by the formula (IIId) in which A is an oxygen atom include 2-N,N-dihydrocarbylaminoethyl acrylates such as 2-N,N-dimethylaminoethyl acrylate and 2-N,N-diethylaminoethyl acrylate; 3-N,N-dihydrocarbylaminopropyl acrylates such as 3-N,N-dimethylaminopropyl acrylate; 2-N,N-dihydrocarbylaminoethyl methacrylates such as 2-N,N-dimethylaminoethyl methacrylate and 2-N,N-diethylaminoethyl methacrylate; and 3-N,N-dihydrocarbylaminopropyl methacrylates such as 3-N,N-dimethylaminopropyl methacrylate. The compound is preferably 3-N,N-dihydrocarbylaminopropyl acrylate, and more preferably 3-N,N-dimethylaminopropyl acrylate.

Examples of the compound represented by the formula (IIId) in which A is a group represented by $-NR^{35}-$ ($R^{35}$ is a hydrocarbyl group or a hydrogen atom) include N,N-dihydrocarbylaminoethylacrylamides such as N,N-dimethylaminoethylacrylamide and N,N-diethylaminoethylacrylamide; N,N-dihydrocarbylaminopropylacrylamides such as N,N-dimethylaminopropylacrylamide and N,N-diethylaminopropylacrylamide; N,N-dihydrocarbylaminobutylacrylamides such as N,N-dimethylaminobutylacrylamide and N,N-diethylaminobutylacrylamide; N,N-dihydrocarbylaminoethylmethacrylamides such as N,N-dimethylaminoethylmethacrylamide and N,N-diethylaminoethylmethacrylamide; N,N-dihydrocarbylaminopropylmethacrylamides such as N,N-dimethylaminopropylmethacrylamide and N,N-diethylaminopropylmethacrylamide; and N,N-dihydrocarbylaminobutylmethacrylamides such as N,N-dimethylaminobutylmethacrylamide and N,N-diethylaminobutylmethacrylamide. The compound is preferably N,N-dihydrocarbylaminopropylacrylamide, and more preferably N,N-dimethylaminopropylacrylamide.

The compound represented by the formula (III) is preferably a compound represented by the formula (IIId), particularly preferably N,N-dihydrocarbylaminopropylacrylamide, and most preferably N,N-dimethylaminopropylacrylamide.

In addition to those described above, preferable examples of the compound containing a nitrogen atom and/or a silicon atom include an alkoxysilyl group-containing compound.

The alkoxysilyl group-containing compound is preferably a compound containing a nitrogen atom and an alkoxysilyl group, and more preferably a compound represented by the following formula (IV):

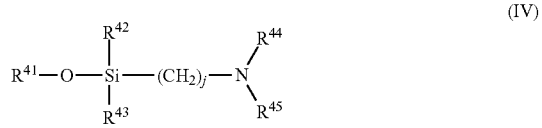

wherein $R^{41}$ represents a hydrocarbyl group; $R^{42}$ and $R^{43}$ each represent a hydrocarbyl group or a hydrocarbyloxy group; $R^{44}$ represents an optionally substituted hydrocarbyl group or a trihydrocarbylsilyl group, or is joined to $R^{45}$ to form a hydrocarbylene group optionally containing, as a hetero atom, at least one selected from the group consisting of a silicon atom, a nitrogen atom and an oxygen atom; $R^{45}$ represents an optionally substituted hydrocarbyl group or a trihydrocarbylsilyl group, or is joined to $R^{44}$ to form a hydrocarbylene group optionally containing, as a hetero atom, at least one selected from the group consisting of a silicon atom, a nitrogen atom and an oxygen atom; and j represents an integer of 1 to 5.

In the formula (IV), the optionally substituted hydrocarbyl group is a hydrocarbyl group or a substituted hydrocarbyl group. Examples of the hydrocarbyl group include alkyl groups such as a methyl group, an ethyl group, an n-propyl group, an isopropyl group, and an n-butyl group; alkenyl groups such as a vinyl group, an allyl group, and an isopropenyl group; and aryl groups such as a phenyl group. The hydrocarbyl group is preferably an alkyl group, and more preferably a methyl group or an ethyl group. Examples of the substituted hydrocarbyl group include oxacycloalkyl groups such as an oxiranyl group and a tetrahydrofuranyl group, and preferably a tetrahydrofuranyl group.

Herein, the oxacycloalkyl group represents a group in which $CH_2$ on an alicycle of a cycloalkyl group is replaced with an oxygen atom.

Examples of the hydrocarbyloxy group include alkoxy groups such as a methoxy group, an ethoxy group, an n-propoxy group, an isopropoxy group, an n-butoxy group, a sec-butoxy group, and a tert-butoxy group; and aryloxy groups such as a phenoxy group and a benzyloxy group. The hydrocarbyloxy group is preferably an alkoxy group, and more preferably a methoxy group or an ethoxy group.

Examples of the trihydrocarbylsilyl group include a trimethylsilyl group and a tert-butyl-dimethylsilyl group, and preferably a trimethylsilyl group.

The hydrocarbylene group optionally containing, as a hetero atom, at least one selected from the group consisting of a silicon atom, a nitrogen atom and an oxygen atom is a hydrocarbylene group, or a hetero atom-containing hydrocarbylene group in which the hetero atom is at least one selected from the group consisting of a silicon atom, a nitrogen atom and an oxygen atom. Examples of the hetero atom-containing hydrocarbylene group in which the hetero atom is at least one selected from the group consisting of a silicon atom, a nitrogen atom and an oxygen atom include a hetero atom-containing hydrocarbylene group in which the hetero atom is a silicon atom, a hetero atom-containing hydrocarbylene group in which the hetero atom is a nitrogen atom, and a hetero atom-containing hydrocarbylene group in which the hetero atom is an oxygen atom. Examples of the hydrocarbylene group include alkylene groups such as a tetramethylene group, a pentamethylene group, a hexamethylene group, a pentan-2-en-1,5-diyl group, and a 2,2,4-trimethylhexane-1,6-diyl group. Among them, a $C_{4-7}$ alkylene group is preferable, and a pentamethylene group or a hexamethylene group is particularly preferable. Examples of the hetero atom-containing hydrocarbylene group in which the hetero atom is a silicon atom include a group represented by —Si(CH$_3$)$_2$—CH$_2$—CH$_2$—Si(CH$_3$)$_2$—. Examples of the hetero atom-containing hydrocarbylene group in which the hetero atom is a nitrogen atom include a group represented by —CH=N—CH=CH—, or a group represented by —CH=N—CH$_2$—CH$_2$—. Examples of the hetero atom-containing hydrocarbylene group in which the hetero atom is an oxygen atom include a group represented by —CH$_2$—CH$_2$—O—CH$_2$—CH$_2$—.

In the formula (IV), $R^{41}$ is preferably a $C_{1-4}$ alkyl group, and more preferably a methyl group or an ethyl group. $R^{42}$ and $R^{43}$ each are preferably a hydrocarbyloxy group, more preferably a $C_{1-4}$ alkoxy group, and still more preferably a methoxy group or an ethoxy group. $R^{44}$ and $R^{45}$ each are preferably a hydrocarbyl group, more preferably a $C_{1-4}$ alkyl group, and still more preferably a methyl group or an ethyl group. Here, j is preferably an integer of 2 to 4.

Examples of the compound represented by the formula (IV) include [(dialkylamino)alkyl]alkoxysilane compounds such as 3-dimethylaminopropyltriethoxysilane, 3-dimethylaminopropyltrimethoxysilane, 3-diethylaminopropyltriethoxysilane, 3-diethylaminopropyltrimethoxysilane, 3-dimethylaminopropylmethyldiethoxysilane, 2-dimethylaminoethyltriethoxysilane, and 2-dimethylaminoethyltrimethoxysilane; cyclic aminoalkylalkoxysilane compounds such as hexamethyleneiminomethyltrimethoxysilane, 3-hexamethyleneiminopropyltriethoxysilane, N-(3-triethoxysilylpropyl)-4,5-dihydroimidazole, and N-(3-trimethoxysilylpropyl)-4,5-imidazole; [di(tetrahydrofuranyl)amino]alkylalkoxysilane compounds such as 3-[di(tetrahydrofuranyl)amino]propyltrimethoxysilane and 3-[di(tetrahydrofuranyl)amino]propyltriethoxysilane; and N,N-bis(trialkylsilyl)aminoalkylalkoxysilane compounds such as N,N-bis(trimethylsilyl)aminopropylmethyldimethoxysilane and N,N-bis(trimethylsilyl)aminopropylmethyldiethoxysilane. Among the above examples, [(dialkylamino)alkyl]alkoxysilane compounds are preferable, and 3-dimethylaminopropyltriethoxysilane, 3-dimethylaminopropyltrimethoxysilane, 3-diethylaminopropyltriethoxysilane, and 3-diethylaminopropyltrimethoxysilane are more preferable.

Examples of the compound containing an alkoxysilyl group, in addition to the aforementioned compounds containing a nitrogen atom and an alkoxysilyl group, include tetraalkoxysilanes such as tetramethoxysilane, tetraethoxysilane, and tetra-n-propoxysilane; trialkoxyhydrocarbylsilanes such as methyltrimethoxysilane, methyltriethoxysilane, ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; alkoxysilylalkylsuccinic acid anhydrides such as 3-trimethoxysilylpropylsuccinic acid anhydride and 3-triethoxysilylpropylsuccinic acid anhydride; and (methacryloyloxyalkyl)alkoxysilane compounds such as 3-methacryloyloxypropyltrimethoxysilane and 3-methacryloyloxypropyltriethoxysilane.

The compound containing an alkoxysilyl group may contain a nitrogen atom and a carbonyl group. Examples of the compound containing a nitrogen atom and a carbonyl group as well as an alkoxysilyl group include tris[(alkoxysilyl)

alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Among them, tris [3-(trimethoxysilyl)propyl]isocyanurate is preferable.

Examples of the compound containing a nitrogen atom and/or a silicon atom include an N,N-dialkyl-substituted carboxylic acid amide dialkyl acetal compound. Examples of the N,N-dialkyl-substituted carboxylic acid amide dialkyl acetal compound include N,N-dialkylformamide dialkyl acetals such as N,N-dimethylformamide dimethyl acetal and N,N-diethylformamide dimethyl acetal; N,N-dialkylacetamide dialkyl acetals such as N,N-dimethylacetamide dimethyl acetal and N,N-diethylacetamide dimethyl acetal; and N,N-dialkylpropionamide dialkyl acetals such as N,N-dimethylpropionamide dimethyl acetal and N,N-diethylpropionamide dimethyl acetal. Among them, N,N-dialkylformamide dialkyl acetals are preferable, and N,N-dimethylformamide dimethyl acetals are more preferable.

In the method of producing the modified copolymer, a coupling agent may be added to a solution of the modified copolymer in a hydrocarbon at any time from the initiation of the polymerization of monomers before the recovery of the polymer as described later. Examples of the coupling agent include a compound represented by the following formula (V):

$$R^{51}{}_{a}ML_{4-a} \quad (V)$$

wherein $R^{51}$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent represented by the formula (V) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

For enhancing the processability of the conjugated diene polymer, the amount of the coupling agent to be added is preferably not less than 0.03 mol and more preferably not less than 0.05 mol, per mol of an alkali metal derived from an alkali metal catalyst. For enhancing the fuel economy, the amount is preferably not more than 0.4 mol and more preferably not more than 0.3 mol.

In the method of producing the modified copolymer, an unreacted active terminal may be treated with alcohol, such as methanol or isopropyl alcohol, before recovery of a polymer as described later.

As a method of recovering a modified copolymer from the solution of the modified copolymer in a hydrocarbon, known methods may be employed. Examples of the method include (A) a method of adding a coagulant to the solution of the modified copolymer in a hydrocarbon, and (B) a method of adding steam to the solution of the modified copolymer in a hydrocarbon (steam stripping treatment). The recovered modified copolymer may be dried with a known dryer, such as a band dryer or an extrusion-type dryer.

For achieving a balanced enhancement in the processability, fuel economy, rubber strength, wet-grip performance, and handling stability, the amount of the structural unit derived from the polymerization initiator represented by the formula (I) in the modified copolymer, when expressed per unit mass of the polymer, is preferably not less than 0.0001 mmol/g polymer, and more preferably not less than 0.001 mmol/g polymer, whereas it is preferably not more than 0.15 mmol/g polymer, and more preferably not more than 0.1 mmol/g polymer.

For achieving a balanced enhancement in the processability, fuel economy, rubber strength, wet-grip performance, and handling stability, the amount of the structural unit derived from the silicon-containing vinyl compound in the modified copolymer, when expressed per unit mass of the polymer, is preferably not less than 0.01 mmol/g polymer, and more preferably not less than 0.02 mmol/g polymer, whereas it is preferably not more than 0.4 mmol/g polymer, and more preferably not more than 0.2 mmol/g polymer.

For achieving a balanced enhancement in the processability, fuel economy, rubber strength, wet-grip performance, and handling stability, the modified copolymer preferably contains a structural unit derived from the compound represented by the formula (II). The structural unit derived from the compound represented by the formula (II) in the modified copolymer refers to a structural unit represented by the following formula (IIb):

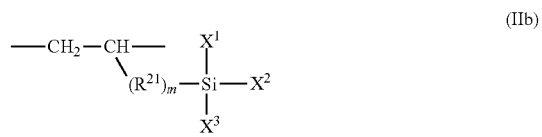

wherein m, $R^{21}$, $X^1$, $X^2$, and $X^3$ are the same as those stated in the description of the formula (II).

In the modified copolymer, preferably, at least one of $X^1$, $X^2$ and $X^3$ is replaced by a hydroxy group, more preferably two or more of $X^1$, $X^2$ and $X^3$ are replaced by hydroxy groups, and still more preferably two of $X^1$, $X^2$ and $X^3$ are replaced by hydroxy groups, in the structural unit derived from the compound represented by the formula (II) in the conjugated diene polymer. This enables to enhance the effect of enhancing the processability, fuel economy, rubber strength, wet-grip performance, and handling stability. Unlimited examples of a method of replacing at least one of $X^1$, $X^2$, and $X^3$ with a hydroxy group include steam stripping treatment.

The copolymers (A), (B), and (C) are preferably used together with other rubber materials. Examples of other rubber materials include polyisoprene-based rubbers, polybutadiene rubber (BR), butadiene-isoprene copolymer rubber, and butyl rubber. Other examples thereof include ethylene-propylene copolymers and ethylene-octene copolymers. Two or more kinds of these rubber materials may be used in combination. Polyisoprene-based rubbers are especially preferred as they can enhance the effect of improving the wet-grip performance while maintaining the fuel economy.

Examples of the polyisoprene-based rubbers include natural rubber (NR), and polyisoprene rubber (IR). The NR is not particularly limited, and examples thereof include those usually used in the tire industry, such as SIR20, RSS#3, TSR20, deproteinized natural rubber (DPNR), highly purified natural rubber (HPNR), and epoxidized natural rubber (ENR). Similarly, IRs usually used in the tire industry may be used.

In the case where the rubber composition of the present invention includes a polyisoprene-based rubber, the amount of the polyisoprene-based rubber based on 100% by mass of the rubber component is preferably not less than 1% by mass, more preferably not less than 10% by mass, and still more preferably not less than 15% by mass. If the amount is less than 1% by mass, the rubber strength may decrease and the cohesion of the rubber compound during mixing may be so poor that productivity can be deteriorated. The amount of the polyisoprene-based rubber is preferably not more than 30% by mass, more preferably not more than 25% by mass, and still more preferably not more than 20% by mass. If the amount of the polyisoprene-based rubber exceeds 30% by mass, the wet-grip performance tends to deteriorate.

The rubber composition of the present invention contains a silica having a nitrogen adsorption specific surface area ($N_2SA$) of 40 to 400 $m^2/g$. Unlimited examples of the silica include dry silica (anhydrous silica) and wet silica (hydrous silica). Wet silica is preferable because it has more silanol groups. One kind of silica may solely be used, and two or more kinds of silica may be used in combination.

The silica has a nitrogen adsorption specific surface area ($N_2SA$) of not less than 40 $m^2/g$, preferably not less than 50 $m^2/g$, and more preferably not less than 60 $m^2/g$. If the silica has a $N_2SA$ of less than 40 $m^2/g$, the silica tends to have little reinforcement, and thus the rubber strength tends to decrease. The silica has a $N_2SA$ of not more than 400 $m^2/g$, preferably not more than 360 $m^2/g$, and more preferably not more than 300 $m^2/g$. A silica having a $N_2SA$ of more than 400 $m^2/g$ tends not to disperse easily, and thus the fuel economy and processability tend to deteriorate.

The $N_2SA$ of silica is determined by the BET method in accordance with ASTM D3037-93.

The amount of the silica for each 100 parts by mass of the rubber component is not less than 10 parts by mass, preferably not less than 30 parts by mass, and more preferably not less than 45 parts by mass. If the amount is less than 10 parts by mass, the effect producible by blending silica tends not to be sufficiently achieved, and the rubber strength tends to decrease. The amount of the silica is not more than 150 parts by mass, and preferably not more than 100 parts by mass. If the amount exceeds 150 parts by mass, the processability tends to deteriorate.

One kind of silica may solely be used, but preferably two or more kinds of silica are used in combination. A combination use of silica (1) having a nitrogen adsorption specific surface area of at least 50 $m^2/g$ but less than 120 $m^2/g$, and silica (2) having a nitrogen adsorption specific surface area of not less than 120 $m^2/g$ is more preferable. If the silica (1) and the silica (2) are mixed with the polymers (A) and (B), the silica (1) and the silica (2) disperse well so that the effect of improving the properties can be synergistically enhanced.

The silica (1) and the silica (2) preferably satisfy the inequality: ($N_2SA$ of silica (2))/($N_2SA$ of silica (1))≥1.4, and more preferably satisfy the inequality: ($N_2SA$ of silica (2))/($N_2SA$ of silica (1))≥2.0. If the ratio of ($N_2SA$ of silica (2))/($N_2SA$ of silica (1)) is less than 1.4, the difference in the particle diameter between the silica (1) and the silica (2) is small. Thus, a dispersibility-improving effect producible by blending two kinds of silica tends not to be sufficiently achieved.

The silica (1) has a $N_2SA$ of not less than 50 $m^2/g$, and preferably not less than 70 $m^2/g$. If the silica (1) has a $N_2SA$ of less than 50 $m^2/g$, the silica tends to have an insufficient reinforcement, and the rubber strength, and handling stability may deteriorate. The silica (1) has a $N_2SA$ of less than 120 $m^2/g$, and preferably not more than 115 $m^2/g$. If the silica (1) has a $N_2SA$ of not less than 120 $m^2/g$, the effect producible by the combination use of the silica (1) and the silica (2) may not be sufficiently achieved.

The silica (2) has a $N_2SA$ of not less than 120 $m^2/g$, and preferably not less than 150 $m^2/g$. If the silica (2) has a $N_2SA$ of less than 120 $m^2/g$, the effect producible by the combination use of the silica (1) and the silica (2) may not be sufficiently achieved. The silica (2) has a $N_2SA$ of preferably not more than 250 $m^2/g$, and more preferably not more than 220 $m^2/g$. If the silica (2) has a $N_2SA$ of more than 250 $m^2/g$, the fuel economy and processability tend to deteriorate.

The amounts of the silica (1) and the silica (2) preferably satisfy the following inequality:

(Amount of silica (1))×0.06≤(Amount of silica (2))≤(Amount of silica (1))×15.

If the amount of the silica (2) is less than 0.06 times the amount of the silica (1), a sufficient rubber strength tends not to be achieved. If the amount of the silica (2) is more than 15 times the amount of the silica (1), the rolling resistance tends to increase. The amount of the silica (2) is more preferably not less than 0.3 times the amount of the silica (1), and still more preferably not less than 0.5 times the amount of the silica (1). Also, the amount of the silica (2) is more preferably not more than 7 times the amount of the silica (1), and still more preferably not more than 4 times the amount of the silica (1).

The amount of the silica (1) is preferably not less than 5 parts by mass, and more preferably not less than 10 parts by mass for each 100 parts by mass of the rubber component. If the amount of the silica (1) is less than 5 parts by mass, the fuel economy may not be sufficiently improved. Also, the amount of the silica (1) is preferably not more than 90 parts by mass, and more preferably not more than 70 parts by mass. If the amount of the silica (1) is more than 90 parts by mass, good fuel economy is achieved, but the rubber strength tends to decrease.

The amount of the silica (2) is preferably not less than 5 parts by mass, and more preferably not less than 10 parts by mass for each 100 parts by mass of the rubber component. If the amount of the silica (2) is less than 5 parts by mass, sufficient handling stability may not be achieved. Also, the amount of the silica (2) is preferably not more than 90 parts by mass, and more preferably not more than 70 parts by mass. If the amount of the silica (2) is more than 90 parts by mass, good handling stability is achieved; however, the processability tends to deteriorate.

The combined amount of the silica (1) and the silica (2) is not less than 10 parts by mass, preferably not less than 30 parts by mass, and more preferably not less than 45 parts by mass for each 100 parts by mass of the rubber component. If the combined amount is less than 10 parts by mass, the effect producible by blending the silica (1) and the silica (2) may not be sufficiently achieved. Thus, the rubber strength tends to decrease. The combined amount of the silica (1) and the silica (2) is not more than 150 parts by mass, and preferably not more than 100 parts by mass. If the combined amount exceeds 150 parts by mass, the processability tends to deteriorate.

The silica may be used together with a silane coupling agent. Examples of silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazole tetrasulfide. Preferred among these are bis(3-triethoxysilylpropyl)tetrasulfide and 3-trimethoxysilylpropylbenzothiazolyl tetrasulfide in terms of reinforcement improving effects. One kind of the silane coupling agent may solely be used, and two or more kinds of the silane coupling agents may be used in combination.

The amount of the silane coupling agent is preferably not less than 1 part by mass, and more preferably not less than 2 parts by mass for each 100 parts by mass of the silica. If the amount is less than 1 part by mass, the resulting unvulcanized rubber composition has high viscosity so that the processability tends to deteriorate. Also, the amount of the silane coupling agent is preferably not more than 20 parts by mass, and more preferably not more than 15 parts by mass. If the amount exceeds 20 parts by mass, effects commensurate with cost increase tend not to be obtained.

Known additives may be used, and examples thereof include vulcanization agents such as sulfur; vulcanization accelerators such as a thiazole-based vulcanization accelerator, a thiuram-based vulcanization accelerator, a sulfenamide-based vulcanization accelerator, and a guanidine-based vulcanization accelerator; vulcanization activating agents such as stearic acid and zinc oxide; organic peroxides; fillers such as carbon black, calcium carbonate, talc, alumina, clay, aluminum hydroxide, and mica; processing aids such as extender oils and lubricants; and antioxidants.

Examples of the carbon black include furnace black (furnace carbon black) such as SAF, ISAF, HAF, MAF, FEF, SRF, GPF, APF, FF, CF, SCF or ECF; acetylene black (acetylene carbon black); thermal black (thermal carbon black) such as FT or MT; channel black (channel carbon black) such as EPC, MPC or CC; and graphite. Any of these may be used alone or two or more of these may be used in combination.

The amount of the carbon black is preferably not less than 1 part by mass, more preferably not less than 6 parts by mass, and still more preferably not less than 10 parts by mass for each 100 parts by mass of the rubber component. If the amount is less than 1 part by mass, sufficient reinforcement may not be achieved. Also, the amount of the carbon black is preferably not more than 60 parts by mass, more preferably not more than 30 parts by mass, and still more preferably not more than 20 parts by mass. If the amount is more than 60 parts by mass, the fuel economy tends to deteriorate.

The nitrogen adsorption specific surface area ($N_2SA$) of carbon black is usually 5 to 200 $m^2/g$, and preferably the lower limit and the upper limit thereof are 50 $m^2/g$ and 150 $m^2/g$, respectively. The dibutyl phthalate (DBP) absorption amount of carbon black is usually 5 to 300 mL/100 g, and preferably the lower limit and the upper limit thereof are 80 mL/100 g and 180 mL/100 g, respectively. If the $N_2SA$ or DBP absorption amount of carbon black is lower than the lower limit of the above ranges, the reinforcement is small, and the rubber strength tends to decrease. If the $N_2SA$ or DBP absorption amount of carbon black is larger than the upper limit of the above ranges, the carbon black does not disperse well, and the hysteresis loss increases. Thus, the fuel economy tends to deteriorate. The nitrogen adsorption specific surface area is measured in accordance with ASTM D4820-93. The DBP absorption amount is measured in accordance with ASTM D2414-93. Examples of commercially available carbon black include SEAST 6, SEAST 7HM, and SEAST KH (trade name, produced by Tokai Carbon Co., Ltd.), and CK 3 and Special Black 4A (trade name, produced by Evonik Degussa).

Examples of the extender oil include aromatic mineral oils (viscosity gravity constant (V.G.C. value) 0.900 to 1.049), naphthenic mineral oils (V.G.C. value 0.850 to 0.899), and paraffinic mineral oils (V.G.C. value 0.790 to 0.849). The polycyclic aromatic content in the extender oil is preferably less than 3% by mass, and more preferably less than 1% by mass. The polycyclic aromatic content is measured according to the British Institute of Petroleum 346/92 Method. The aromatic compound (CA) content in the extender oil is preferably not less than 20% by mass. Two or more kinds of these extender oils may be used in combination. Among these extender oils, aromatic-based mineral oils (aromatic oils) and paraffin-based mineral oils (mineral oils) are preferred, and a combination use of aromatic oil and mineral oil is more preferred.

In terms of achieving the effect of the present invention well, the amount of the extender oil (oil) is preferably not less than 10 parts by mass, and more preferably not less than 20 parts by mass, whereas it is preferably not more than 50 parts by mass, and more preferably not more than 40 parts by mass, for each 100 parts by mass of the rubber component.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The amount thereof to be used is preferably 0.1 to 5 parts by mass, and more preferably 0.2 to 3 parts by mass for each 100 parts by mass of the rubber component.

Known methods may be employed for producing a rubber composition by adding other rubber materials and additives to the copolymers (A) and (B). Examples of the method include a method of kneading components with a known mixer such as a roll mill or a Banbury mixer.

With regard to the kneading conditions for the case where additives other than the vulcanization agent and the vulcanization accelerator are mixed, the kneading temperature is usually 50 to 200° C., and preferably 80 to 190° C., and the kneading time is usually 30 seconds to 30 minutes, and preferably 1 minute to 30 minutes.

In the case where the vulcanization agent and the vulcanization accelerator are mixed, the kneading temperature is usually not higher than 100° C., and preferably room temperature to 80° C. The composition containing a vulcanization agent and a vulcanization accelerator is usually used after it is vulcanized by press vulcanization or the like. The vulcanization temperature is usually 120 to 200° C., and preferably 140 to 180° C.

The rubber composition of the present invention has a tan δ peak temperature of not lower than −20° C. If the rubber composition has a tan δ peak temperature of lower than −20° C., sufficient wet-grip performance may not be surely achieved. The rubber composition of the present invention has a tan δ peak temperature of preferably not higher than −5° C., and more preferably not higher than −8° C. If the rubber composition has a tan δ peak temperature of higher than −5° C., the temperature dependence increases so that sufficient wet-grip performance may not be achieved in a wide temperature range.

Meanwhile, the tan δ peak temperature is a value measured by the method described in Examples.

The rubber composition of the present invention can achieve not only good fuel economy but also excellent wet-grip performance in a wide temperature range.

The rubber composition of the present invention may be used for components of a tire, particularly suitably for treads.

The pneumatic tire of the present invention is formed from the rubber composition by a usual method. Namely, before vulcanization, the rubber composition optionally containing various additives is extruded and processed into the shape of a tire component (e.g., tread), and then molded in a normal manner on a tire building machine and assembled with other tire components to provide an unvulcanized tire. Then, the unvulcanized tire is heated and pressed in a vulcanizer into a pneumatic tire. Thus, the pneumatic tire of the present invention can be produced.

The pneumatic tire of the present invention is suitably used as tires for passenger vehicles.

Examples

The present invention is specifically described based on examples. However, the present invention is not limited thereto.

The following is a list of chemical agents used in the synthesis or polymerization. The chemical agents were purified as needed by usual methods.
THF: anhydrous tetrahydrofuran, produced by Kanto Chemical Co., Inc.
Sodium hydride: produced by Kanto Chemical Co., Inc.
Diethylamine: produced by Kanto Chemical Co., Inc.
Methylvinyldichlorosilane: produced by Shin-Etsu Chemical Co., Ltd.
Anhydrous hexane: produced by Kanto Chemical Co., Inc.
Styrene: produced by Kanto Chemical Co., Inc.
Butadiene: 1,3-butadiene, produced by Tokyo Chemical Industry Co., Ltd.
TMEDA: tetramethylethylenediamine, produced by Kanto Chemical Co., Inc.
Initiator (1): 1.6 M n-butyllithium in hexane, produced by Kanto Chemical Co., Inc.
Initiator (2): AI-200CE2 (compound prepared by bonding 3-(N,N-dimethylamino)-1-propyllithium and two isoprene-derived structural units, represented by the following formula) (0.9 M), produced by FMC

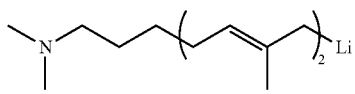

2,6-Di-tert-butyl-p-cresol: Nocrac 200, produced by Ouchi Shinko Chemical Industrial Co., Ltd.
Bis(dimethylamino)methylvinylsilane: produced by Shin-Etsu Chemical Co., Ltd.
N,N-dimethylaminopropylacrylamide: produced by Tokyo Chemical Industry Co., Ltd.
3-Diethylaminopropyltriethoxysilane: produced by Azmax Co., Ltd.
1,3-Dimethyl-2-imidazolidinone: produced by Tokyo Chemical Industry Co., Ltd.
Tris[3-(trimethoxysilyl)propyl]isocyanurate: produced by Shin-Etsu Chemical Co., Ltd.
N,N-dimethylformamide dimethyl acetal: produced by Tokyo Chemical Industry Co., Ltd.

<Production of Modifier (1) (Main Chain Modifier)>
In a nitrogen atmosphere, 15.8 g of bis(dimethylamino)methylvinylsilane was charged into a 100-mL volumetric flask, and also anhydrous hexane was added to increase the total amount to 100 mL. In this manner, a modifier (1) was produced.

<Production of Modifier (2) (Terminal Modifier)>
In a nitrogen atmosphere, 15.6 g of N,N-dimethylaminopropylacrylamide was charged into a 100-mL volumetric flask, and also anhydrous hexane was added to increase the total amount to 100 mL. In this manner, a modifier (2) was produced.

<Production of Modifier (3) (Main Chain Modifier)>
THF (1000 mL) and sodium hydride (13 g) were charged into a sufficiently nitrogen-purged 2-L three-necked flask, and diethylamine (36.5 g) was slowly added dropwise thereto on an ice water bath while stirring. After stirring for 30 minutes, methylvinyldichlorosilane (36 g) was added dropwise over 30 minutes, followed by stirring for 2 hours. The resulting solution was concentrated, filtered, and purified by distillation under reduced pressure to give bis(diethylamino)methylvinylsilane. The bis(diethylamino)methylvinylsilane (21.4 g) was charged into a 100-mL volumetric flask in a nitrogen atmosphere, and also anhydrous hexane was added to increase the total amount to 100 mL. In this manner, a modifier (3) was produced.

<Production of Modifier (4) (Terminal Modifier)>
In a nitrogen atmosphere, 3-diethylaminopropyltriethoxysilane (27.7 g) was charged into a 100-mL volumetric flask, and also anhydrous hexane was added to increase the total amount to 100 mL. In this manner, a modifier (4) was produced.

<Production of Modifier (5) (Terminal Modifier)>
In a nitrogen atmosphere, 1,3-dimethyl-2-imidazolidinone (11.4 g) was charged into a 100-mL volumetric flask, and also anhydrous hexane was added to increase the total amount to 100 mL. In this manner, a modifier (5) was produced.

<Production of Modifier (6) (Terminal Modifier)>
In a nitrogen atmosphere, tris[3-(trimethoxysilyl)propyl] isocyanurate (30.7 g) was charged into a 100-mL volumetric flask, and also anhydrous hexane was added to increase the total amount to 200 mL. In this manner, a modifier (6) was produced.

<Production of Modifier (7) (Terminal Modifier)>
In a nitrogen atmosphere, N,N-dimethylformamide dimethyl acetal (11.9 g) was charged into a 100-mL volumetric flask, and also anhydrous hexane was added to increase the total amount to 200 mL. In this manner, a modifier (7) was produced.

<Copolymer Analysis>
Copolymers (copolymers of an aromatic vinyl compound and a conjugated diene compound) obtained as mentioned below were analyzed by the following methods.

<Measurement of Weight-Average Molecular Weight (Mw) and Number-Average Molecular Weight (Mn)>
The weight-average molecular weight (Mw) and number-average molecular weight (Mn) of each copolymer were measured using gel permeation chromatography (GPC) (GPC-8000 series produced by Tosoh Corporation, detector: differential refractometer, column: TSKGEL SUPERMULTIPORE HZ-M produced by Tosoh Corporation), and expressed relative to polystyrene standards. A molecular weight distribution Mw/Mn was calculated from the measurement results.

<Structural Identification of Copolymers>
Structures of the copolymers were identified (measurement of styrene content and vinyl bond content) with a device of JNM-ECA series produced by JEOL Ltd. Each polymer (0.1 g) was dissolved in toluene (15 mL), and the solution was slowly introduced in methanol (30 mL) for reprecipitation. The resulting precipitate was dried under reduced pressure, and then measured.

<Synthesis of Copolymer (1)> n-Hexane (18 L), styrene (550 g), butadiene (1450 g), and TMEDA (10 mmol) were charged into a sufficiently nitrogen-purged 30-L pressure resistant container, and heated to 40° C. After further addition of the initiator (1) (34 mL), the mixture was heated to 50° C., and stirred for 3 hours. Next, the modifier (4) (40 mL) was added, followed by stirring for 30 minutes, and the reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (1).

Here, 1.18 mol of the compound (modifier (4)) containing a nitrogen atom and/or a silicon atom was added per mol of the alkali metal derived from the polymerization initiator added.

<Synthesis of Copolymer (2)>

A copolymer (2) was produced based on the same formulation as that for synthesis of the copolymer (1), except that the amounts of styrene and butadiene were changed to 300 g and 1700 g, respectively.

Here, 1.18 mol of the compound (modifier (4)) containing a nitrogen atom and/or a silicon atom was added per mol of the alkali metal derived from the polymerization initiator added.

<Synthesis of Copolymer (3)>

A copolymer (3) was produced based on the same formulation as that for synthesis of the copolymer (1), except that the amounts of styrene and butadiene were changed to 800 g and 1200 g, respectively.

Here, 1.18 mol of the compound (modifier (4)) containing a nitrogen atom and/or a silicon atom was added per mol of the alkali metal derived from the polymerization initiator added.

<Synthesis of Copolymer (4)> n-Hexane (18 L), styrene (300 g), butadiene (1450 g), and THF (40 mmol) were charged into a sufficiently nitrogen-purged 30-L pressure resistant container, and heated to 70° C. After further addition of the initiator (1) (34 mL), the mixture was heated to 50° C., and stirred for 3 hours. Next, the modifier (4) (40 mL) was added, followed by stirring for 30 minutes, and the reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (4).

Here, 1.18 mol of the compound (modifier (4)) containing a nitrogen atom and/or a silicon atom was added per mol of the alkali metal derived from the polymerization initiator added.

<Synthesis of Copolymer (5)> n-Hexane (18 L), styrene (300 g), butadiene (1450 g), and THF (40 mmol) were charged into a sufficiently nitrogen-purged 30-L pressure resistant container, and heated to 30° C. After further addition of the initiator (1) (34 mL), the mixture was heated to 50° C., and stirred for 3 hours. Next, the modifier (4) (40 mL) was added, followed by stirring for 30 minutes, and the reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (5).

Here, 1.18 mol of the compound (modifier (4)) containing a nitrogen atom and/or a silicon atom was added per mol of the alkali metal derived from the polymerization initiator added.

<Synthesis of Copolymer (6)>

A copolymer (6) was produced based on the same formulation as that for synthesis of the copolymer (1), except that the amounts of styrene and butadiene were changed to 420 g and 1580 g, respectively.

Here, 1.18 mol of the compound (modifier (4)) containing a nitrogen atom and/or a silicon atom was added per mol of the alkali metal derived from the polymerization initiator added.

<Synthesis of Copolymer (7)> n-Hexane (18 L), styrene (300 g), butadiene (1700 g), the modifier (1) (40 mL), and TMEDA (10 mmol) were charged into a sufficiently nitrogen-purged 30-L pressure resistant container, and heated to 40° C. After further addition of the initiator (2) (34 mL), the mixture was heated to 50° C., and stirred for 3 hours. Next, the modifier (2) (20 mL) was added, followed by stirring for 30 minutes, and the reaction solution was mixed with methanol (15 mL) and 2,6-tert-butyl-p-cresol (0.1 g). Thereafter, a coagulum was recovered from the polymer solution by steam stripping treatment, and the coagulum was dried under reduced pressure for 24 hours to give a copolymer (7).

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (8)>

A copolymer (8) was produced based on the same formulation as that for synthesis of the copolymer (7), except that the modifier (3) was used instead of the modifier (1).

Here, 0.43 g of the silicon-containing vinyl compound (modifier (3)) was added for each 100 g of the monomer component; 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (9)>

A copolymer (9) was produced based on the same formulation as that for synthesis of the copolymer (7), except that the modifier (4) was used instead of the modifier (2).

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (10)>

A copolymer (10) was produced based on the same formulation as that for synthesis of the copolymer (8), except that the modifier (4) was used instead of the modifier (2).

Here, 0.43 g of the silicon-containing vinyl compound (modifier (3)) was added for each 100 g of the monomer component; 0.85 mmol of the polymerization initiator (initiator (2)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (11)>

A copolymer (11) was produced based on the same formulation as that for synthesis of the copolymer (7), except that the amounts of styrene and butadiene were changed to 420 g and 1580 g, respectively.

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (2)) containing a nitrogen atom and/or a silicon atom was added per mol of the alkali metal derived from the polymerization initiator added.

<Synthesis of Copolymer (12)>

A copolymer (12) was produced based on the same formulation as that for synthesis of the copolymer (9), except that the amounts of styrene and butadiene were changed to 420 g and 1580 g, respectively.

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (4)) containing a nitrogen atom and/or a silicon atom was added per mol of the alkali metal derived from the polymerization initiator added.

<Synthesis of Copolymer (13)>

A copolymer (13) was produced based on the same formulation as that for synthesis of the copolymer (7), except that the modifier (5) was used instead of the modifier (2).

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (14)>

A copolymer (14) was produced based on the same formulation as that for synthesis of the copolymer (8), except that the modifier (5) was used instead of the modifier (2).

Here, 0.43 g of the silicon-containing vinyl compound (modifier (3)) was added for each 100 g of the monomer component; 0.85 mmol of the polymerization initiator (initiator (2)) was added for each 100 g of the monomer component; and 1.18 mol of the compound (modifier (5)) containing a nitrogen atom and/or a silicon atom was added per mol of the alkali metal derived from the polymerization initiator added.

<Synthesis of Copolymer (15)>

A copolymer (15) was produced based on the same formulation as that for synthesis of the copolymer (7), except that the modifier (6) was used instead of the modifier (2).

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (6)) containing a nitrogen atom and/or a silicon atom was added per mol of the alkali metal derived from the polymerization initiator added.

<Synthesis of Copolymer (16)>

A copolymer (16) was produced based on the same formulation as that for synthesis of the copolymer (8), except that the modifier (6) was used instead of the modifier (2).

Here, 0.43 g of the silicon-containing vinyl compound (modifier (3)) was added for each 100 g of the monomer component; 0.85 mmol of the polymerization initiator (initiator (2)) was added for each 100 g of the monomer component; and 1.18 mol of the compound (modifier (6)) containing a nitrogen atom and/or a silicon atom was added per mol of the alkali metal derived from the polymerization initiator added.

<Synthesis of Copolymer (17)>

A copolymer (17) was produced based on the same formulation as that for synthesis of the copolymer (7), except that the modifier (7) was used instead of the modifier (2).

Here, 0.32 g of the silicon-containing vinyl compound (modifier (1)) was added for each 100 g of the monomer component; 0.85 mmol of the polymerization initiator (initiator (2)) was added for each 100 g of the monomer component; and 1.18 mol of the compound (modifier (7)) containing a nitrogen atom and/or a silicon atom was added per mol of the alkali metal derived from the polymerization initiator added.

<Synthesis of Copolymer (18)>

A copolymer (18) was produced based on the same formulation as that for synthesis of the copolymer (8), except that the modifier (7) was used instead of the modifier (2).

Here, 0.43 g of the silicon-containing vinyl compound (modifier (3)) was added for each 100 g of the monomer component; 0.85 mmol of the polymerization initiator (initiator (2)) was added for each 100 g of the monomer component; and 1.18 mol of the compound (modifier (7)) containing a nitrogen atom and/or a silicon atom was added per mol of the alkali metal derived from the polymerization initiator added.

Table 1 summarizes the monomer components and others of the copolymers (1) to (18).

TABLE 1

| Copolymer | Initiator | Monomer component | Terminal modifier | Styrene content (% by mass) | Vinyl bond content (mol %) | Molecular weight distribution Mw/Mn | Molecular weight Mw(unit: ten thousand) |
|---|---|---|---|---|---|---|---|
| Copolymer (1) | Initiator (1) | Styrene, 1,3-Butadiene | Modifier (4) | 28 | 56 | 1.14 | 27.1 |
| Copolymer (2) | Initiator (1) | Styrene, 1,3-Butadiene | Modifier (4) | 14 | 56 | 1.13 | 25.6 |
| Copolymer (3) | Initiator (1) | Styrene, 1,3-Butadiene | Modifier (4) | 40 | 58 | 1.15 | 27.8 |
| Copolymer (4) | Initiator (1) | Styrene, 1,3-Butadiene | Modifier (4) | 14 | 23 | 1.19 | 25.1 |
| Copolymer (5) | Initiator (1) | Styrene, 1,3-Butadiene | Modifier (4) | 14 | 41 | 1.18 | 26.2 |
| Copolymer (6) | Initiator (1) | Styrene, 1,3-Butadiene | Modifier (4) | 21 | 56 | 1.14 | 27.1 |
| Copolymer (7) | Initiator (2) | Styrene, 1,3-Butadiene, Modifier (1) | Modifier (2) | 14 | 56 | 1.13 | 24.8 |
| Copolymer (8) | Initiator (2) | Styrene, 1,3-Butadiene, Modifier (3) | Modifier (2) | 14 | 56 | 1.18 | 26.0 |
| Copolymer (9) | Initiator (2) | Styrene, 1,3-Butadiene, Modifier (1) | Modifier (4) | 14 | 56 | 1.19 | 27.2 |
| Copolymer (10) | Initiator (2) | Styrene, 1,3-Butadiene, Modifier (3) | Modifier (4) | 14 | 56 | 1.20 | 25.8 |

TABLE 1-continued

| Copolymer | Initiator | Monomer component | Terminal modifier | Styrene content (% by mass) | Vinyl bond content (mol %) | Molecular weight distribution Mw/Mn | Molecular weight Mw(unit: ten thousand) |
|---|---|---|---|---|---|---|---|
| Copolymer (11) | Initiator (2) | Styrene, 1,3-Butadiene, Modifier (1) | Modifier (2) | 21 | 56 | 1.13 | 26.7 |
| Copolymer (12) | Initiator (2) | Styrene, 1,3-Butadiene, Modifier (1) | Modifier (4) | 21 | 56 | 1.19 | 27.2 |
| Copolymer (13) | Initiator (2) | Styrene, 1,3-Butadiene, Modifier (1) | Modifier (5) | 14 | 56 | 1.18 | 26.7 |
| Copolymer (14) | Initiator (2) | Styrene, 1,3-Butadiene, Modifier (3) | Modifier (5) | 14 | 56 | 1.19 | 27.4 |
| Copolymer (15) | Initiator (2) | Styrene, 1,3-Butadiene, Modifier (1) | Modifier (6) | 14 | 56 | 1.19 | 27.5 |
| Copolymer (16) | Initiator (2) | Styrene, 1,3-Butadiene, Modifier (3) | Modifier (6) | 14 | 56 | 1.22 | 28.0 |
| Copolymer (17) | Initiator (2) | Styrene, 1,3-Butadiene, Modifier (1) | Modifier (7) | 14 | 56 | 1.21 | 27.3 |
| Copolymer (18) | Initiator (2) | Styrene, 1,3-Butadiene, Modifier (3) | Modifier (7) | 14 | 56 | 1.20 | 28.1 |

The following describes the various chemicals used in the examples and comparative examples.
Copolymers (1) to (18): synthesized as above
Natural Rubber: TSR20
Silica 1: ZEOSIL 1085GR produced by Rhodia (nitrogen adsorption specific surface area: 80 m$^2$/g)
Silica 2: ZEOSIL 115GR produced by Rhodia (nitrogen adsorption specific surface area: 110 m$^2$/g)
Silica 3: ZEOSIL 1165 MP produced by Rhodia (nitrogen adsorption specific surface area: 160 m$^2$/g)
Silica 4: ZEOSIL 1205 MP produced by Rhodia (nitrogen adsorption specific surface area: 200 m$^2$/g)
Silane coupling agent: Si69 (bis(3-triethoxysilylpropyl)tetrasulfide) produced by Evonik Degussa
Carbon black: Diablack N339 (N$_2$SA: 96 m$^2$/g, DBP absorption: 124 mL/100 g) produced by Mitsubishi Chemical Corporation
Aromatic Oil: X-140 produced by JX Nippon Oil & Energy Corporation
Mineral Oil: PS-32 (paraffin-based process oil) produced by Idemitsu Kosan Co., Ltd
Antioxidant: Antigene 3C produced by Sumitomo Chemical Co., Ltd.
Stearic acid: TSUBAKI stearic acid beads produced by NOF Corporation
Zinc oxide: Zinc oxide #1 produced by Mitsui Mining & Smelting Co., Ltd.
Wax: Sunnoc N produced by Ouchi Shinko Chemical Industrial Co., Ltd.
Sulfur: sulfur powder produced by Tsurumi Chemical Industry Co., Ltd.
Vulcanization accelerator 1: Soxinol CZ produced by Sumitomo Chemical Co., Ltd.
Vulcanization accelerator 2: Soxinol D produced by Sumitomo Chemical Co., Ltd.

Examples and Comparative Examples

According to each of the formulations shown in Tables 2 to 4, the materials other than the sulfur and vulcanization accelerators were kneaded for 5 minutes at 150° C. using a 1.7-L Banbury mixer (produced by Kobe Steel, Ltd.) to give a kneadate. The sulfur and vulcanization accelerators were then added to the kneadate, followed by kneading for 5 minutes at 80° C. using an open roll mill to give an unvulcanized rubber composition. The unvulcanized rubber composition was press-vulcanized for 20 minutes at 170° C. in a 0.5 mm-thick mold to obtain a vulcanized rubber composition.

Separately, the unvulcanized rubber composition was formed into a tread shape and assembled with other tire components on a tire building machine to form an unvulcanized tire. The unvulcanized tire was vulcanized for 12 minutes at 170° C. to prepare a test tire (size: 195/65R15).

<Evaluation Items and Test Methods>
<Tan δ Peak Temperature>

The tan δ of each vulcanized rubber composition was measured under a dynamic strain amplitude of 1%, a frequency of 10 Hz, a rate of temperature rise of 2° C./min. over a measurement temperature range from −80 to 80° C. using a spectrometer (produced by Ueshima Seisakusho Co., Ltd.). The temperature at which tan δ reached its peak was determined as a tan δ peak temperature.

<Mixing and Kneading Processability Index>

The Mooney viscosity (ML$_{1+4}$/130° C.) of each unvulcanized rubber composition was determined in accordance with JIS K6300-1:2001 "Rubber, unvulcanized—Physical property—Part 1: Determination of Mooney viscosity and pre-vulcanization characteristics with Mooney viscometer" using a Mooney viscosity tester. That is, under a temperature condition of 130° C. achieved by 1 minute pre-heating, the Mooney viscosity of the unvulcanized rubber composition was measured after a small rotor was rotated for 4 minutes. The result is expressed as an index. A larger value indicates a lower Mooney viscosity, which in turn indicates better mixing and kneading processability. The index was calculated based on the following equation.

(Mixing and kneading processability index)=(Mooney viscosity of Comparative Example 1)/(Mooney viscosity of each formulation)×100

<Low-Heat-Build-Up Property Index>

The tan δ of each vulcanized rubber composition was measured at a dynamic strain amplitude of 1%, a frequency of 10 Hz, and a temperature of 50° C. using a spectrometer (produced by Ueshima Seisakusho Co., Ltd.). The reciprocal value of the tan δ is expressed as an index relative to that of Comparative Example 1 regarded as 100. A larger index indicates a smaller rolling resistance (less heat build-up), which in turn indicates better fuel economy.

<Rubber Strength Index>

Each sample was subjected to a tensile test in accordance with JIS K 6251:2010 to measure the elongation at break. The measurement result was expressed as an index relative to that of Comparative Example 1 regarded as 100. A larger index indicates higher rubber strength (tensile strength at break).

(Rubber strength index)=(Elongation at break of each formulation)/(Elongation at break of Comparative Example 1)×100

<Wet-Grip Performance Index>

The test tires of each example were mounted on all the wheels of a vehicle (front-engine, front-wheel drive (FF) vehicle, 2000 cc, made in Japan). The braking distance from an initial speed of 100 km/h was determined on a wet asphalt road. The result is expressed as an index. A larger index indicates better wet-skid performance (wet-grip performance). The index was calculated based on the following equation.

(Wet-grip performance index)=(Braking distance in Comparative Example 1)/(Braking distance of each formulation)×100

<Wet-Grip Temperature Dependence Index>

The test tires of each example were mounted on all the wheels of a vehicle (front-engine, front-wheel drive (FF) vehicle, 2000 cc, made in Japan). The braking distance (breaking distance A) from an initial speed of 100 km/h on a wet asphalt road at a road surface temperature of 25° C. was determined. Similarly, the braking distance (breaking distance B) from an initial speed of 100 km/h on a wet asphalt road at a road surface temperature of 15° C. was determined. The ratio between the breaking distance A and the breaking distance B was determined as an index of wet-grip temperature dependence. A higher index indicates a smaller temperature dependence of the wet-grip performance, and is thus better.

(Wet-grip temperature dependence index)=[(Braking distance B in Comparative Example 1)/(Braking distance A in Comparative Example 1)]/[(Braking distance B of each formulation)/(Braking distance A of each formulation)]×100

<Handling Stability>

The test tires of each example were mounted on all the wheels of a front-engine, front-wheel drive (FF) vehicle (2000 cc, made in Japan), and the vehicle was driven on a test track (dry road surface). The handling stability was evaluated based on sensory evaluation by a driver. The evaluation was made on a scale of 1 to 10, with 10 being the highest rating. Ratings are relative to Comparative Example 1, which was given a rating of 6. A higher rating indicates better handling stability.

TABLE 2

| | | Styrene content (% by mass) | Vinyl content (mol %) | Com. Ex. 1 | Ex. 1 | Com. Ex. 2 | Ex. 2 | Ex. 3 | Ex. 4 | Ex. 5 |
|---|---|---|---|---|---|---|---|---|---|---|
| Formulation (parts by mass) | Copolymer (1) | 28 | 56 | — | 30 | 10 | 50 | 50 | 50 | 70 |
| | Copolymer (2) | 14 | 56 | — | 50 | 70 | 30 | — | — | 10 |
| | Copolymer (3) | 40 | 58 | — | — | — | — | — | — | — |
| | Copolymer (4) | 14 | 23 | — | — | — | — | — | 30 | — |
| | Copolymer (5) | 14 | 41 | — | — | — | — | 30 | — | — |
| | Copolymer (6) | 21 | 56 | 80 | — | — | — | — | — | — |
| | Copolymer (7) | 14 | 56 | — | — | — | — | — | — | — |
| | Copolymer (8) | 14 | 56 | — | — | — | — | — | — | — |
| | Copolymer (9) | 14 | 56 | — | — | — | — | — | — | — |
| | Copolymer (10) | 14 | 56 | — | — | — | — | — | — | — |
| | Copolymer (11) | 21 | 56 | — | — | — | — | — | — | — |
| | Copolymer (12) | 21 | 56 | — | — | — | — | — | — | — |
| | Natural rubber | | | 20 | 20 | 20 | 20 | 20 | 20 | 20 |
| | Silica 1 ($N_2SA$: 80 $m^2/g$) | | | — | — | — | — | — | — | — |
| | Silica 2 ($N_2SA$: 110 $m^2/g$) | | | — | — | — | — | — | — | — |
| | Silica 3 ($N_2SA$: 160 $m^2/g$) | | | 75 | 75 | 75 | 75 | 75 | 75 | 75 |
| | Silica 4 ($N_2SA$: 200 $m^2/g$) | | | — | — | — | — | — | — | — |
| | Silane coupling agent | | | 6 | 6 | 6 | 6 | 6 | 6 | 6 |
| | Carbon black | | | 15 | 15 | 15 | 15 | 15 | 15 | 15 |
| | Aromatic oil | | | 25 | 25 | 25 | 20 | 25 | 25 | 15 |
| | Mineral oil | | | — | — | — | 5 | 5 | 5 | 10 |
| | Antioxidant | | | 1.5 | 1.5 | 1.5 | 1.5 | 1.5 | 1.5 | 1.5 |
| | Stearic acid | | | 2 | 2 | 2 | 2 | 2 | 2 | 2 |
| | Zinc oxide | | | 2.5 | 2.5 | 2.5 | 2.5 | 2.5 | 2.5 | 2.5 |
| | Wax | | | 1 | 1 | 1 | 1 | 1 | 1 | 1 |
| | Sulfur | | | 2 | 2 | 2 | 2 | 2 | 2 | 2 |
| | Vulcanization accelerator 1 | | | 1.8 | 1.8 | 1.8 | 1.8 | 1.8 | 1.8 | 1.8 |
| | Vulcanization accelerator 2 | | | 1.2 | 1.2 | 1.2 | 1.2 | 1.2 | 1.2 | 1.2 |
| Evaluation | tan δ peak temperature | | | −19 | −18 | −25 | −18 | −16 | −19 | −18 |
| | Mixing and kneading processability index | | | 100 | 103 | 102 | 105 | 104 | 103 | 104 |
| | Low-heat-build-up property index | | | 100 | 101 | 105 | 100 | 100 | 104 | 99 |
| | Rubber strength index | | | 100 | 103 | 96 | 105 | 106 | 103 | 100 |
| | Wet-grip performance index | | | 100 | 104 | 90 | 107 | 112 | 104 | 110 |
| | Wet-grip temperature dependence index | | | 100 | 110 | 107 | 108 | 106 | 106 | 102 |
| | Handling stability | | | 6 | 6 | 5.75 | 6.25 | 6.25 | 6.25 | 6.5 |

| | | Styrene content (% by mass) | Vinyl content (mol %) | Ex. 6 | Ex. 7 | Com. Ex. 3 | Ex. 8 | Ex. 9 | Com. Ex. 4 | Ex. 10 | Ex. 11 |
|---|---|---|---|---|---|---|---|---|---|---|---|
| Formulation (parts by mass) | Copolymer (1) | 28 | 56 | 40 | 10 | — | 30 | 30 | — | 30 | 30 |
| | Copolymer (2) | 14 | 56 | 30 | 30 | — | — | — | — | — | — |
| | Copolymer (3) | 40 | 58 | 10 | 40 | — | — | — | — | — | — |
| | Copolymer (4) | 14 | 23 | — | — | — | — | — | — | — | — |
| | Copolymer (5) | 14 | 41 | — | — | — | — | — | — | — | — |
| | Copolymer (6) | 21 | 56 | — | — | — | — | — | — | — | — |
| | Copolymer (7) | 14 | 56 | — | — | — | 50 | — | — | — | — |
| | Copolymer (8) | 14 | 56 | — | — | — | — | 50 | — | — | — |
| | Copolymer (9) | 14 | 56 | — | — | — | — | — | — | 50 | — |
| | Copolymer (10) | 14 | 56 | — | — | — | — | — | — | — | 50 |

TABLE 2-continued

|  |  |  |  |  |  |  |  |  |  |  |
|---|---|---|---|---|---|---|---|---|---|---|
|  | Copolymer (11) | 21 | 56 | — | — | 80 | — | — | — | — |
|  | Copolymer (12) | 21 | 56 | — | — | — | — | 80 | — | — |
|  | Natural rubber |  |  | 20 | 20 | 20 | 20 | 20 | 20 | 20 | 20 |
|  | Silica 1 (N₂SA: 80 m²/g) |  |  | — | — | — | — | — | — | — | — |
|  | Silica 2 (N₂SA: 110 m²/g) |  |  | — | — | — | — | — | — | — | — |
|  | Silica 3 (N₂SA: 160 m²/g) |  |  | 75 | 75 | 75 | 75 | 75 | 75 | 75 | 75 |
|  | Silica 4 (N₂SA: 200 m²/g) |  |  | — | — | — | — | — | — | — | — |
|  | Silane coupling agent |  |  | 6 | 6 | 6 | 6 | 6 | 6 | 6 | 6 |
|  | Carbon black |  |  | 15 | 15 | 15 | 15 | 15 | 15 | 15 | 15 |
|  | Aromatic oil |  |  | 25 | — | 25 | 25 | 25 | 25 | 25 | 25 |
|  | Mineral oil |  |  | 5 | 15 | — | — | — | — | — | — |
|  | Antioxidant |  |  | 1.5 | 1.5 | 1.5 | 1.5 | 1.5 | 1.5 | 1.5 | 1.5 |
|  | Stearic acid |  |  | 2 | 2 | 2 | 2 | 2 | 2 | 2 | 2 |
|  | Zinc oxide |  |  | 2.5 | 2.5 | 2.5 | 2.5 | 2.5 | 2.5 | 2.5 | 2.5 |
|  | Wax |  |  | 1 | 1 | 1 | 1 | 1 | 1 | 1 | 1 |
|  | Sulfur |  |  | 2 | 2 | 2 | 2 | 2 | 2 | 2 | 2 |
|  | Vulcanization accelerator 1 |  |  | 1.8 | 1.8 | 1.8 | 1.8 | 1.8 | 1.8 | 1.8 | 1.8 |
|  | Vulcanization accelerator 2 |  |  | 1.2 | 1.2 | 1.2 | 1.2 | 1.2 | 1.2 | 1.2 | 1.2 |
| Evaluation | tan δ peak temperature |  |  | −18 | −17 | −19 | −17 | −17 | −17 | −17 | −17 |
|  | Mixing and kneading processability index |  |  | 103 | 112 | 105 | 119 | 115 | 107 | 114 | 112 |
|  | Low-heat-build-up property index |  |  | 100 | 97 | 130 | 124 | 128 | 120 | 115 | 118 |
|  | Rubber strength index |  |  | 112 | 102 | 104 | 116 | 110 | 103 | 115 | 111 |
|  | Wet-grip performance index |  |  | 112 | 114 | 107 | 110 | 113 | 106 | 107 | 109 |
|  | Wet-grip temperature dependence index |  |  | 115 | 106 | 97 | 108 | 110 | 98 | 108 | 109 |
|  | Handling stability |  |  | 6.5 | 6.5 | 6 | 6 | 6 | 6 | 6 | 6 |

TABLE 3

|  |  | Styrene content | Vinyl content | Comparative Example | | Example | | | | |
|---|---|---|---|---|---|---|---|---|---|---|
|  |  | (% by mass) | (mol %) | 1 | 5 | 12 | 13 | 14 | 15 | 16 |
| Formulation (parts by mass) | Copolymer (1) | 28 | 56 | — | — | 30 | 30 | 30 | 30 | 30 |
|  | Copolymer (2) | 14 | 56 | — | — | 50 | 50 | 50 | 50 | 50 |
|  | Copolymer (3) | 40 | 58 | — | — | — | — | — | — | — |
|  | Copolymer (4) | 14 | 23 | — | — | — | — | — | — | — |
|  | Copolymer (5) | 14 | 41 | — | — | — | — | — | — | — |
|  | Copolymer (6) | 21 | 56 | 80 | 80 | — | — | — | — | — |
|  | Copolymer (7) | 14 | 56 | — | — | — | — | — | — | — |
|  | Copolymer (8) | 14 | 56 | — | — | — | — | — | — | — |
|  | Copolymer (9) | 14 | 56 | — | — | — | — | — | — | — |
|  | Copolymer (10) | 14 | 56 | — | — | — | — | — | — | — |
|  | Copolymer (11) | 21 | 56 | — | — | — | — | — | — | — |
|  | Copolymer (12) | 21 | 56 | — | — | — | — | — | — | — |
|  | Natural rubber |  |  | 20 | 20 | 20 | 20 | 20 | 20 | 20 |
|  | Silica 1 (N₂SA: 80 m²/g) |  |  | — | — | — | — | — | 25 | — |
|  | Silica 2 (N₂SA: 110 m²/g) |  |  | — | 50 | 50 | 30 | 5 | 50 | — |
|  | Silica 3 (N₂SA: 160 m²/g) |  |  | 75 | 25 | 25 | 40 | 70 | — | 25 |
|  | Silica 4 (N₂SA: 200 m²/g) |  |  | — | — | — | — | — | — | 50 |
|  | Silane coupling agent |  |  | 6 | 6 | 6 | 6 | 6 | 6 | 6 |
|  | Carbon black |  |  | 15 | 15 | 15 | 15 | 15 | 15 | 15 |
|  | Aromatic oil |  |  | 25 | 25 | 25 | 25 | 25 | 25 | 25 |
|  | Mineral oil |  |  | — | — | — | — | — | — | — |
|  | Antioxidant |  |  | 1.5 | 1.5 | 1.5 | 1.5 | 1.5 | 1.5 | 1.5 |
|  | Stearic acid |  |  | 2 | 2 | 2 | 2 | 2 | 2 | 2 |
|  | Zinc oxide |  |  | 2.5 | 2.5 | 2.5 | 2.5 | 2.5 | 2.5 | 2.5 |
|  | Wax |  |  | 1 | 1 | 1 | 1 | 1 | 1 | 1 |
|  | Sulfur |  |  | 2 | 2 | 2 | 2 | 2 | 2 | 2 |
|  | Vulcanization accelerator 1 |  |  | 1.8 | 1.8 | 1.8 | 1.8 | 1.8 | 1.8 | 1.8 |
|  | Vulcanization accelerator 2 |  |  | 1.2 | 1.2 | 1.2 | 1.2 | 1.2 | 1.2 | 1.2 |
| Evaluation | tan δ peak temperature |  |  | −19 | −16 | −18 | −18 | −19 | −18 | −16 |
|  | Mixing and kneading processability index |  |  | 100 | 110 | 125 | 118 | 108 | 128 | 85 |
|  | Low-heat-build-up property index |  |  | 100 | 105 | 122 | 120 | 110 | 129 | 95 |
|  | Rubber strength index |  |  | 100 | 93 | 98 | 108 | 106 | 95 | 124 |
|  | Wet-grip performance index |  |  | 100 | 103 | 108 | 114 | 107 | 104 | 102 |
|  | Wet-grip temperature dependence index |  |  | 100 | 100 | 112 | 115 | 111 | 110 | 116 |
|  | Handling stability |  |  | 6 | 6 | 6 | 6.5 | 6 | 6.25 | 6.5 |

TABLE 4

| | | Styrene content (% by mass) | Vinyl content (mol %) | Comparative Example 1 | Example 17 | Example 18 | Example 19 | Example 20 | Example 21 | Example 22 |
|---|---|---|---|---|---|---|---|---|---|---|
| Formulation (parts by mass) | Copolymer (1) | 28 | 56 | — | 30 | 30 | 30 | 30 | 30 | 30 |
| | Copolymer (6) | 21 | 56 | 80 | — | — | — | — | — | — |
| | Copolymer (13) | 14 | 56 | — | 50 | — | — | — | — | — |
| | Copolymer (14) | 14 | 56 | — | — | 50 | — | — | — | — |
| | Copolymer (15) | 14 | 56 | — | — | — | 50 | — | — | — |
| | Copolymer (16) | 14 | 56 | — | — | — | — | 50 | — | — |
| | Copolymer (17) | 14 | 56 | — | — | — | — | — | 50 | — |
| | Copolymer (18) | 14 | 56 | — | — | — | — | — | — | 50 |
| | Natural rubber | | | 20 | 20 | 20 | 20 | 20 | 20 | 20 |
| | Silica 1 (N$_2$SA: 80 m$^2$/g) | | | — | — | — | — | — | — | — |
| | Silica 2 (N$_2$SA: 110 m$^2$/g) | | | — | — | — | — | — | — | — |
| | Silica 3 (N2SA: 160 m2/g) | | | 75 | 75 | 75 | 75 | 75 | 75 | 75 |
| | Silica 4 (N$_2$SA: 200 m$^2$/g) | | | — | — | — | — | — | — | — |
| | Silane coupling agent | | | 6 | 6 | 6 | 6 | 6 | 6 | 6 |
| | Carbon black | | | 15 | 15 | 15 | 15 | 15 | 15 | 15 |
| | Aromatic oil | | | 25 | 25 | 25 | 25 | 25 | 25 | 25 |
| | Mineral oil | | | — | — | — | — | — | — | — |
| | Antioxidant | | | 1.5 | 1.5 | 1.5 | 1.5 | 1.5 | 1.5 | 1.5 |
| | Stearic acid | | | 2 | 2 | 2 | 2 | 2 | 2 | 2 |
| | Zinc oxide | | | 2.5 | 2.5 | 2.5 | 2.5 | 2.5 | 2.5 | 2.5 |
| | Wax | | | 1 | 1 | 1 | 1 | 1 | 1 | 1 |
| | Sulfur | | | 2 | 2 | 2 | 2 | 2 | 2 | 2 |
| | Vulcanization accelerator 1 | | | 1.8 | 1.8 | 1.8 | 1.8 | 1.8 | 1.8 | 1.8 |
| | Vulcanization accelerator 2 | | | 1.2 | 1.2 | 1.2 | 1.2 | 1.2 | 1.2 | 1.2 |
| Evaluation | tan δ peak temperature | | | −19 | −18 | −19 | −18 | −18 | −17 | −18 |
| | Mixing and kneading processability index | | | 100 | 106 | 103 | 106 | 103 | 109 | 106 |
| | Low-heat-build-up property index | | | 100 | 101 | 104 | 100 | 102 | 105 | 109 |
| | Rubber strength index | | | 100 | 120 | 116 | 117 | 114 | 118 | 112 |
| | Wet-grip performance index | | | 100 | 110 | 113 | 112 | 115 | 102 | 105 |
| | Wet-grip temperature dependence index | | | 100 | 108 | 108 | 106 | 107 | 107 | 109 |
| | Handling stability | | | 6 | 6 | 6 | 6 | 6 | 6 | 6 |

As shown in Tables 2 to 4, the rubber compositions of the examples, each combining the copolymers (A) and (B), showed improvements in the wet-grip performance and the temperature dependence of wet-grip performance while ensuring good fuel economy, and also had good processability, rubber strength, and handling stability, as compared with the rubber composition of Comparative Example 1 in which the copolymer (B) alone was combined.

The invention claimed is:

1. A rubber composition, comprising, based on 100% by mass of a rubber component:

5 to 55% by mass of a copolymer (A) of an aromatic vinyl compound and a conjugated diene compound, the copolymer (A) having an aromatic vinyl compound content of 5-14% by mass and a vinyl bond content in the conjugated diene compound moiety of 10 to 70 mol %;

5 to 75% by mass of a copolymer (B) of an aromatic vinyl compound and a conjugated diene compound, the copolymer (B) having an aromatic vinyl compound content of 15-29% by mass and a vinyl bond content in the conjugated diene compound moiety of 10 to 70 mol %; and 5 to 50% by mass of a copolymer (C) of an aromatic vinyl compound and a conjugated diene compound, the copolymer (C) having an aromatic vinyl compound content of 30-44% by mass and a vinyl bond content in the conjugated diene compound moiety of 10 to 70 mol %, and the rubber composition comprising, for each 100 parts by mass of the rubber component, 10 to 150 parts by mass of silica having a nitrogen adsorption specific surface area of 40 to 400 m$^2$/g.

2. The rubber composition according to claim 1, wherein at least one of the copolymers (A), (B), and (C) is obtained by polymerizing a monomer component including a conjugated diene compound and a silicon-containing vinyl compound in the presence of a polymerization initiator represented by the following formula (I):

(I)

wherein i represents 0 or 1; $R^{11}$ represents a $C_{1-100}$ hydrocarbylene group; $R^{12}$ and $R^{13}$ each represent an optionally substituted hydrocarbyl group or a trihydrocarbylsilyl group, or $R^{12}$ and $R^{13}$ are bonded to each other to form a hydrocarbylene group optionally containing at least one hetero atom selected from the group consisting of a silicon atom, a nitrogen atom, and an oxygen atom; and M represents an alkali metal atom, to produce a copolymer, and then reacting a compound containing at least one of a nitrogen atom and a silicon atom with an active terminal of the copolymer.

3. The rubber composition according to claim 2, wherein $R^{11}$ in the formula (I) is a group represented by the following formula (Ia):

(Ia)

wherein $R^{14}$ represents a hydrocarbylene group comprising at least one of a structural unit derived from a conjugated diene compound and a structural unit derived from an aromatic vinyl compound; and n represents an integer of 1 to 10.

4. The rubber composition according to claim 3, wherein $R^{14}$ in the formula (Ia) is a hydrocarbylene group comprising from one to ten isoprene-derived structural units.

5. The rubber composition according to claim 2, wherein the silicon-containing vinyl compound is a compound represented by the following formula (II):

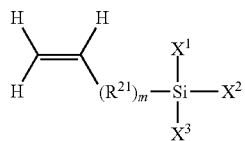

(II)

wherein m represents 0 or 1; $R^{21}$ represents a hydrocarbylene group; and $X^1$, $X^2$, and $X^3$ each represent a substituted amino group, a hydrocarbyloxy group, or an optionally substituted hydrocarbyl group.

6. The rubber composition according to claim 1, wherein the silica includes silica (1) having a nitrogen adsorption specific surface area of at least 50 m²/g but less than 120 m²/g, and silica (2) having a nitrogen adsorption specific surface area of not less than 120 m²/g.

7. The rubber composition according to claim 6, wherein the nitrogen adsorption specific surface areas and amounts of the silica (1) and the silica (2) satisfy the following inequalities:

(Nitrogen adsorption specific surface area of silica (2))/(Nitrogen adsorption specific surface area of silica (1))≥1.4, and (Amount of silica (1))×0.06≤(Amount of silica (2))≤ (Amount of silica (1))×15.

8. A pneumatic tire formed from the rubber composition according to claim 1.

* * * * *